United States Patent
Tenny et al.

(10) Patent No.: US 9,467,885 B2
(45) Date of Patent: Oct. 11, 2016

(54) INTER-FREQUENCY MEASUREMENT CONTROL IN A MULTI-CARRIER SYSTEM

(75) Inventors: Nathan Edward Tenny, Poway, CA (US); Valentin Alexandru Gheorghiu, Tokyo (JP); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 612 days.

(21) Appl. No.: 13/290,706

(22) Filed: Nov. 7, 2011

(65) Prior Publication Data

US 2012/0113866 A1   May 10, 2012

Related U.S. Application Data

(60) Provisional application No. 61/411,365, filed on Nov. 8, 2010, provisional application No. 61/423,527, filed on Dec. 15, 2010.

(51) Int. Cl.
*H04W 24/10* (2009.01)
*H04W 88/06* (2009.01)

(52) U.S. Cl.
CPC ............ *H04W 24/10* (2013.01); *H04W 88/06* (2013.01)

(58) Field of Classification Search
CPC ............... H04W 88/06; H04W 24/10; H04W 36/0088; H04W 48/12; H04W 76/048; H04W 36/008; H04W 76/028; H04W 24/08; H04L 27/0006; H04L 5/0091; H04L 5/0053; H04L 5/001
See application file for complete search history.

(56) References Cited

U.S. PATENT DOCUMENTS

| | | | |
|---|---|---|---|
| 2010/0267394 A1* | 10/2010 | Wu | 455/450 |
| 2010/0296488 A1* | 11/2010 | Kuo | 370/332 |
| 2011/0026476 A1* | 2/2011 | Lee et al. | 370/329 |
| 2011/0105105 A1 | 5/2011 | Sågfors et al. | |
| 2011/0105122 A1 | 5/2011 | Wu | |
| 2011/0237202 A1* | 9/2011 | Uemura | H04W 36/0088 455/67.14 |

(Continued)

FOREIGN PATENT DOCUMENTS

| | | |
|---|---|---|
| CN | 101682854 A | 3/2010 |
| CN | 101867878 A | 10/2010 |

(Continued)

OTHER PUBLICATIONS

Discussion on Measurement Gap Signalling for Rel-10 CA UE, Media Tek Inc., Filename: http://www.3gpp.org/ftb/tsg_ran/WG2_RL2/TSGR2_72bis/Docs/R2-110265.zip, Jan. 17-21, 2011.

(Continued)

*Primary Examiner* — Yee Lam
(74) *Attorney, Agent, or Firm* — Harrity & Harrity, LLP

(57) ABSTRACT

Techniques are disclosed for signaling a capability to operate in one or more carrier aggregation configurations and measurement gap requirements corresponding to the carrier aggregation configurations. Each carrier aggregation configuration may include one or more frequency bands and a mobile terminal can provide an indication of its measurement gap requirements for all or a subset of its supported frequency bands when operating in the carrier aggregation configurations. The measurement gap requirements may correspond to a physical or logical configuration of receiver resources and the signaling may be initiated by the mobile terminal or by a base station in communication with the mobile terminal.

83 Claims, 16 Drawing Sheets

(56) References Cited

U.S. PATENT DOCUMENTS

| | | | |
|---|---|---|---|
| 2011/0244805 A1* | 10/2011 | Wu | 455/67.11 |
| 2011/0274007 A1* | 11/2011 | Lin et al. | 370/254 |
| 2012/0040687 A1* | 2/2012 | Siomina et al. | 455/456.1 |
| 2012/0076041 A1* | 3/2012 | Jung et al. | 370/252 |
| 2012/0094608 A1* | 4/2012 | Shi et al. | 455/67.11 |
| 2012/0099461 A1* | 4/2012 | Yi et al. | 370/252 |
| 2012/0155312 A1* | 6/2012 | Kim et al. | 370/252 |
| 2013/0235755 A1* | 9/2013 | Lucky | H04W 24/04 370/252 |

FOREIGN PATENT DOCUMENTS

| | | | | |
|---|---|---|---|---|
| EP | 2129161 | A1 | 12/2009 | |
| EP | 2242300 | A1 | 10/2010 | |
| EP | 2341730 | A1 | 7/2011 | |
| WO | 2010032675 | A1 | 3/2010 | |
| WO | WO 2011052164 | A1 * | 5/2011 | H04W 36/0088 |

OTHER PUBLICATIONS

Huawei: "Consideration on UE RF capability in CA", 3GPP Draft; R4-102608, 3rd Generation Partnership Project (3GPP), Mobile Competence Centre ; 650, Route Des Lucioles ; F-06921 Sophia-Antipolis Cedex ; France, vol. RAN WG4, No. Bratislava; 20100628, Jul. 1, 2010, XP050454813, [retrieved on Jul. 1, 2010].

Huawei: "Flexible CA/MIMO configuration and related CA/MIMO capabilities information report", 3GPP Draft; R4-102612, 3rd Generation Partnership Project (3GPP), Mobil Competence Centre ; 650, Route Des Lucioles ; F-06921 Sophia-Antipolis Cedex ; France, vol. RAN WG4, No. Bratislava; 20100628, Jun. 24, 2010, XP050454752, [retrieved on Jun. 24, 2010].

Huawei: "Receiver Impact on Measurement", 3GPP Draft; R2-103948 Receiver Impact on Measurement, 3rd Generation Partnership Project (3GPP), Mobile Competence Centre ; 650, Route Des Lucioles ; F-06921 Sophia-Antipolis Cedex ; France, vol. RAN WG2, No. Stockholm, Sweden; 20100628, Jun. 22, 2010, XP050451304, [retrieved on Jun. 22, 2010].

International Search Report and Written Opinion—PCT/US2011/059829—ISA/EPO—Jan. 31, 2012.

Samsung: "Consideration on UE capability in CA scenario", 3GPP Draft; R4-101840, 3rd Generation Partnership Project (3GPP), Mobile Competence Centre ; 650, Route Des Lucioles ; F-06921 Sophia-Anti Polis Cedex ; France, vol. RAN WG4, No. Montreal, Canada; 20100510, May 20, 2010, XP050426822, [retrieved on May 20, 2010].

QUALCOMM Incorporated: "Indication of need for measurement gaps in carrier aggregation" 3GPP TSG-RAN WG2 #71 R2-106284, 2010.

* cited by examiner

| A | B | C | D | E | F |
|---|---|---|---|---|---|
| 0 (gaps not needed) | Omit (active) | 1 (gaps needed) | Omit (active) | 1 (gaps needed) | 0 (gaps not needed) |

(PESSIMISTIC NETWORK)

(OPTIMISTIC NETWORK)

MEASURED BAND

|   | A | B | C | D | E | F |
|---|---|---|---|---|---|---|
| A |   | 0 | 0 | 0 | 0 | 0 |
| B | 0 |   | 0 | 0 | 0 | 0 |
| C | 0 | 0 |   | 0 | 0 | 0 |
| D | 0 | 0 | 0 |   | 0 | 0 |
| E | 0 | 0 | 0 | 0 |   |   |
| F | 0 | 0 | 0 | 0 | 0 |   |

ACTIVE BAND

FIG. 11C

MEASURED BAND

|   | A | B | C | D | E | F |
|---|---|---|---|---|---|---|
| A |   | 1 | 1 | 0 | 0 | 1 |
| B | 1 |   |   | 0 | 1 |   |
| C | 1 |   |   | 0 | 0 |   |
| D | 1 | 0 | 0 |   | 0 | 0 |
| E | 0 | 1 | 0 | 0 |   | 0 |
| F | 1 |   |   | 0 | 0 |   |

ACTIVE BAND

FIG. 11D

INTER-FREQUENCY MEASUREMENT CONTROL IN A MULTI-CARRIER SYSTEM

CLAIM OF PRIORITY UNDER 35 U.S.C. §119

The present application for patent claims priority to Provisional Application No. 61/411,365 entitled "Inter-Frequency Measurement Control in a Multi-Carrier System," filed Nov. 8, 2010, assigned to the assignee hereof and hereby expressly incorporated herein by reference. The present application for patent also claims priority to Provisional Application No. 61/423,527 entitled "Inter-Frequency Measurement Control in a Multi-Carrier System," filed Dec. 15, 2010, assigned to the assignee hereof and incorporated by reference herein.

TECHNICAL FIELD

Aspects of the present invention relate generally to wireless communications and, in particular, to methods and apparatuses for the control of inter-frequency measurements in wireless communication systems.

BACKGROUND

Wireless communication systems are widely deployed to provide various types of communication content such as voice, data, and so on. These systems may be multiple-access systems capable of supporting communication with multiple users by sharing system resources (e.g., bandwidth and transmit power).

In some wireless communication systems, a mobile terminal and a base station communicate on a downlink from the base station to the mobile terminal and an uplink from the mobile terminal to the base station. The mobile station may be capable of operating on different bands, but on only one active band at any time. As a result, the mobile terminal must interrupt communications on the active band in order to measure the channel quality of any other band within its operating capabilities.

SUMMARY

Techniques for determining and signaling requirements for measurement gaps in a multi-carrier/multi-band wireless communication system are disclosed. In one aspect, a mobile terminal signals a capability to operate in one or more carrier aggregation (CA) configurations each comprising one or more frequency bands and provides, for each CA configuration, an indication of measurement gap requirements when the mobile terminal operates in said each CA configuration for frequency bands supported by the mobile terminal.

In one aspect, the UE generates a capabilities message including the capability to operate in the one or more CA configurations and the indication of the measurement gap requirements and sends the capabilities message to a serving base station.

In one aspect, the UE receives a configuration command to select a carrier aggregation configuration from a set of carrier aggregation configurations, assigns receiver resources to operate on communication bands associated with carriers in the selected carrier aggregation configuration, and signals inter-frequency measurement gap requirements based on the selected carrier aggregation configuration.

In one aspect, the UE receives a reconfiguration request for an other carrier aggregation configuration selected from the set, and signals inter-frequency measurement gap requirements based on the other carrier aggregation configuration selected from the subset.

In one aspect, the UE receives a frequency measurement request based on the inter-frequency measurement gap requirements, and signals a "cannot comply" indication when the measurement request is incompatible with a logical or physical configuration of the mobile terminal.

In one aspect, a base station configured for multi-carrier operation receives from a mobile terminal an indication of a capability to operate in one or more carrier aggregation (CA) configurations, each comprising one or more frequency bands, and for each CA configuration, receives an indication of measurement gap requirements when the mobile terminal operates in said each CA configuration for frequency bands supported by the mobile terminal.

Other aspects include apparatuses and articles of manufacture for performing the disclosed techniques.

BRIEF DESCRIPTION OF THE DRAWINGS

FIG. 11C illustrates an exemplary measurement gap matrix;

FIG. 11D illustrates another exemplary measurement gap matrix;

DETAILED DESCRIPTION

Figure 1:
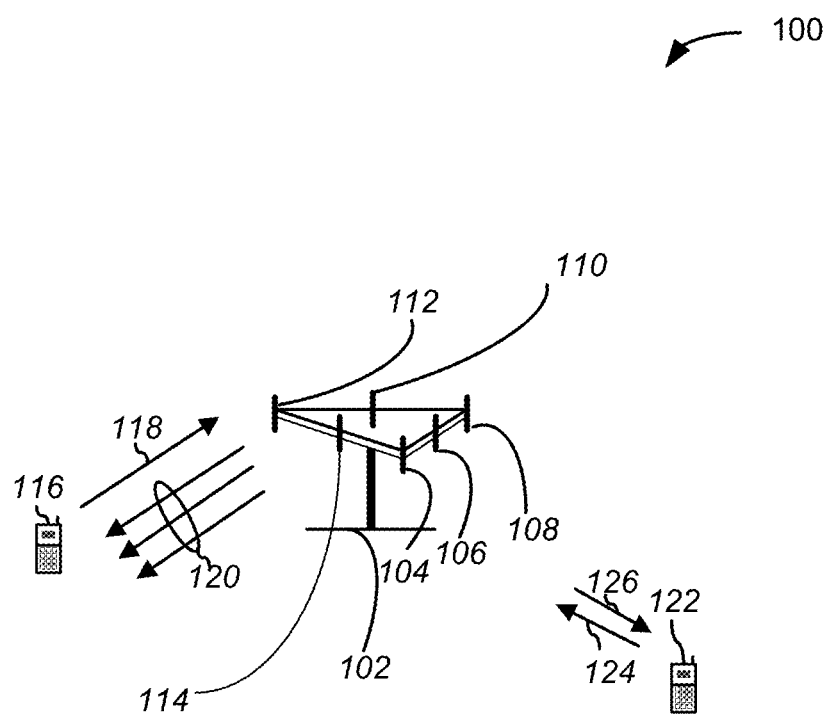
FIG. 1 illustrates an exemplary wireless communication system.

In the following description, for purposes of explanation and not limitation, details and descriptions are set forth in order to provide a thorough understanding of the various disclosed aspects. However, it will be apparent to those skilled in the art that the various disclosed aspects are exemplary and that other aspects may be practiced that depart from these details and descriptions.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer.

By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain aspects are described herein in connection with a user equipment. A user equipment can also be called a user terminal, and may contain some or all of the functionality of a system, subscriber unit, subscriber station, mobile station, mobile wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals. Base stations may contain some or all of the functionality of, an access point, node, Node B, evolved NodeB (eNB) or some other network entity and, in this respect, may be referred to generally as a "network." A base station also communicates over the air-interface with wireless terminals. The communication may take place through one or more sectors.

The base station may act as a router between the wireless terminal and the rest of the access network, which may include an Internet Protocol (IP) network, by converting received air-interface frames to IP packets. The base station may also coordinate management of attributes for the air interface, and may also be the gateway between a wired network and the wireless network. It will be appreciated that network commands to a UE, wherever they originate in the network, are communicated to the UE by one or more base stations.

Various features and aspects of the present disclosure will be presented in terms of systems that may include a number of devices, components, modules, and the like. It is to be understood that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any aspect or design described herein as "exemplary" is not necessarily to be construed as preferred or advantageous over other aspects or designs. Rather, use of the word exemplary is intended to present concepts in a concrete manner.

The techniques described herein may be practiced in a multi-carrier wireless communication system. One exemplary wireless communication system may utilize an orthogonal frequency division multiplex (OFDM) that partitions the overall system bandwidth into multiple ($N_F$) subcarriers, which may also be referred to as frequency sub-channels, tones or frequency bins. Data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on forward and reverse links. The forward link (or downlink, DL) can refer to a communication link from the base stations to the wireless terminals. The reverse link (or uplink, UL) can refer to the communication link from the terminals to the base stations. In a multi-carrier system, one or more component carriers (CCs) can be configured on the DL and the UL for each wireless terminal. Such configurations can be symmetric (in which a wireless terminal has a same number of downlink and uplink component carriers), or asymmetric (in which the wireless has a different number of downlink and uplink carriers). The transmission mode of each CCs, in turn, can be configured separately.

MIMO transmissions employ multiple ($N_T$) transmit antennas and multiple ($N_R$) receive antennas. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO transmission can provide improved performance (e.g., higher throughput and/or greater reliability) if the additional dimensionalities created by the multiple transmit and receive antennas are utilized. MIMO is also supported in both time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

FIG. 1 shows a multi-carrier wireless communication system 100. A base station 102 may include multiple antenna groups, and each antenna group may comprise one or more antennas. For example, if the base station 102 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

A first user equipment 116 communicates with, for example, the fifth antenna 112 and the sixth antenna 114 to enable the transmission of information to the first user equipment 116 over a first forward link 120. As shown, the exemplary first forward link 120 comprises three component carriers (CCs) while the exemplary first reverse link 118 includes one component carrier. The number of component carriers in both the forward link 120 and the reverse link 118 may vary over time and is not limited by the present example. For instance, from time to time, base station 102 may configure and reconfigure a plurality of uplink and downlink CCs for the multi-carrier user equipment 116, 122 it serves.

FIG. 1 also illustrates a second user equipment 122 in communication with, for example, the third antenna 108 and the fourth antenna 110 of base station 102 to enable the transmission of information to the second user equipment 122 over a second forward link 126, and the reception of information from the second user equipment 122 over a second reverse link 124. In a Frequency Division Duplex (FDD) system, the component carriers 118, 120, 124 126 shown in FIG. 1 may use different frequencies for communication. For example, the first forward link 120 may use a different frequency than that used by the first reverse link 118.

Each group of antennas and/or the area in which they are designed to communicate may be referred to as a sector of base station 102. For example, the antenna groups depicted in FIG. 1 may be designed to communicate with the user equipment 116, 122 in a different sectors of the base station 102. On the forward links 120 and 126, the transmitting antennas of the base station 102 may utilize beamforming in order to improve the signal-to-noise ratio of the forward links for the different user equipment 116 and 122. Use of beamforming to transmit to user equipment scattered throughout a coverage area may reduce the amount of interference to user equipment in the neighboring cells.

The exemplary multi-carrier communication system 100 may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

In addition, the various logical transport channels in the communication system may be classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

The downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Figure 2:
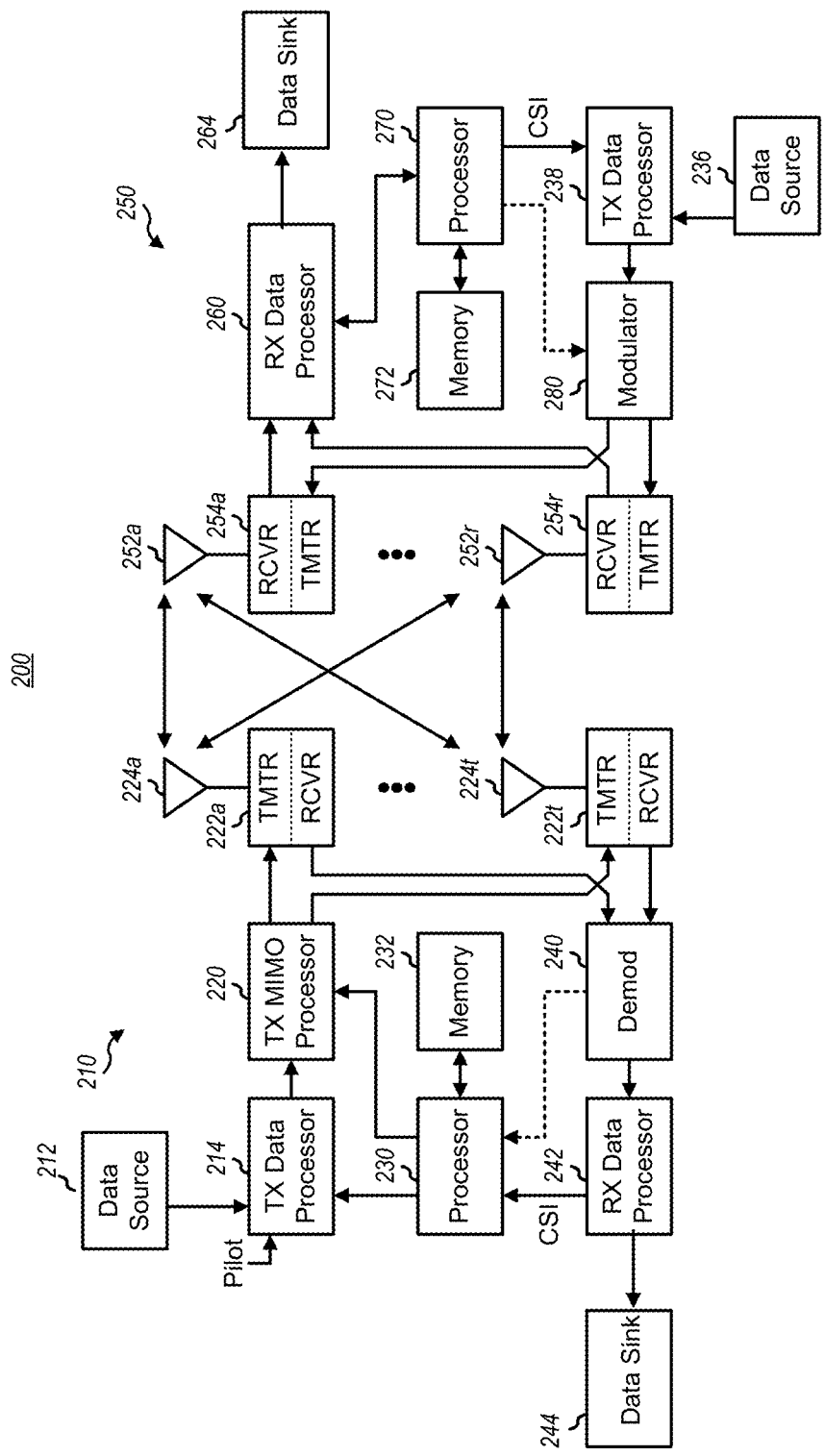
FIG. 2 is a block diagram of an exemplary wireless communication system.

Further, the following terminology and features may be used in describing the various disclosed aspects:
3GPP 3rd Generation Partnership Project
AMC Adaptive modulation and coding
BTS Base transceiver station
CC Component carrier
CSI Channel state information
CQI Channel quality indicator
DCI Downlink control information
DFT-S-OFDM Discrete Fourier transform spread OFDM
DL Downlink (base station to subscriber transmission)
E-UTRAN Evolved UMTS terrestrial radio access network
eNB Evolved Node B
FDD Frequency division duplex
LTE Long term evolution
MIMO Multiple-input-multiple-output
OFDMA Orthogonal frequency division multiple access
PDCCH Physical downlink control channel
PDSCH Physical downlink shared channel
PMI Precoding matrix indicator
PCC Primary component carrier PUCCH Physical uplink control channel
PUSCH Physical uplink shared channel
RI Rank Indicator
SCC Secondary component carrier
SIMO Single-input-multiple-output
UL Uplink FIG. 2 is a block diagram illustrating additional aspects of an exemplary multi-carrier wireless communication system 200 which can be as described in FIG. 1. As shown, system 200 comprises a base station 210 (also referred to as a "transmitter system," "access point," or "eNodeB") and a user equipment 250 (also referred to as a "UE," "receiver system," or "access terminal"). It will be appreciated that even though the base station 210 is referred to as a transmitter system and the user equipment 250 is referred to as a receiver system, as illustrated, these systems communicate bi-directionally. As such, the terms "transmitter system" and "receiver system" are not limited to single direction communications from either system. Further, it should also be noted the base station 210 and the user equipment 250 of FIG. 2 may each communicate with a plurality of other receiver and transmitter systems.

At the base station 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data. The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the base station 210.

In the present example, modulation symbols for all data streams may be provided to a TX MIMO processor 220, which can perform further processing (e.g., for OFDM). The TX MIMO processor 220 may then provide $N_T$ modulation symbol streams to $N_T$ transmitter system transceivers (TMTR) 222a through 222t. The TX MIMO processor 220 may further apply beamforming weights to the symbols of the data streams and to the antenna 224 from which the symbol is transmitted.

Transceiver 222a through 222t at base station 210 receive and process a respective symbol stream to provide one or more analog signals, and further condition the analog signals to provide a modulated signal suitable for transmission. In some systems, the conditioning may include, but is not limited to, operations such as amplification, filtering, up-conversion and the like. The modulated signals produced by the transceivers 222a through 222t are then transmitted from the antennas 224a through 224t of base station 210 as shown in FIG. 2.

At the user equipment 250, the transmitted modulated signals may be received by the antennas 252a through 252r, and the received signal from each of the receiver system antennas 252a through 252r is provided to a respective transceiver (RCVR) 254a through 254r. Each transceiver 254a through 254r at the user equipment 250 may condition a respective received signal, digitize the conditioned signal to provide samples and further processes the samples to provide a corresponding "received" symbol stream. Conditioning may include, but is not limited to, operations such as amplification, filtering, down-conversion and the like.

An RX data processor 260 receives and processes symbol streams from transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 can demodulate, de-interleave and decode each detected symbol stream to recover the traffic data for the corresponding data stream. The processing by the RX data processor 260 may be complementary to that performed by the TX MIMO processor 220 and the TX data processor 214 at the base station 210. The RX data processor 260 can additionally provide processed symbol streams to a data sink 264.

A channel response estimate may be generated by the RX data processor 260 and used to perform space/time processing at the receiver system, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the user equipment can further derive channel state information (CSI) which may include information regarding the communication link and/or the received data stream.

The CSI may include, for example, different types of information about channel conditions. For example, CSI can include a rank indicator (RI) and/or a precoding matrix index (PMI) for determining MIMO parameters, and/or wideband or sub-band channel quality information (CQI) for each CC configured by base station 210 for determining data rates and modulation and coding schemes. Processor 270 can generate CSI reports that include PMI, CQI and/or RI for one or more of the carriers configured for use by user equipment 250.

In particular, the CQI (also referred to as "channel quality indicator") may be used by the base station 210 to determine the data rate that can be supported by each of the configured component carriers, taking into account the signal-to-interference plus noise ratio (SINR) and the characteristics of the UE's receiver. At the user equipment 250, the CQI that is produced by the processor 270 is processed by a TX data processor 238, modulated by a modulator 280, conditioned by the receiver system transceivers 254a through 254r and transmitted back to the base station 210. In addition, a data source 236 at the user equipment 250 can provide additional data to be processed by the TX data processor 238.

The user equipment 250 may be capable of receiving and processing spatially multiplexed signals. Spatial multiplexing may be performed at the base station 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system that receives and processes spatially multiplexed signals, a pre-code matrix is typically used at the base station 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the user equipment 250 to feed back information to the base station 210 about the received signals. For example, both the base station 210 and the user equipment 250 may contain a codebook with a number of precoding matrices. Each of these precoding matrices can, in some instances, be related to an amount of cross-correlation experienced in the received signal. Since it is advantageous to send the index of a particular matrix rather than the values in the matrix, the user equipment 250 may send a CSI report with PMI information to the base station 210. A rank indicator (RI) which indicates to the base station 210 how many independent data streams to use in spatial multiplexing may also transmitted.

Communication system 200 can also utilize transmit diversity schemes instead of the spatially multiplexed scheme described above. In these examples, the same data stream is transmitted across the transmitter system antennas 224a through 224t. The data rate delivered to the user equipment 250 is typically lower than spatially multiplexed MIMO communication systems 200. Transmit diversity schemes can provide robustness and reliability of the communication channel. Each of the signals transmitted from the transmitter system antennas 224a through 224t will experience a different interference environment (e.g., fading, reflection, multi-path phase shifts). The different signal characteristics received at the receiver system antennas 252a through 254r may be useful in determining the appropriate data stream.

Other examples may utilize a combination of spatial multiplexing and transmit diversity. For example, in a system with four antennas 224, a first data stream may be transmitted on two of the antennas, and a second data stream may be transmitted on the remaining two antennas. In these exemplary systems, the rank indicator may be set to an integer lower than the full rank of the precode matrix, indicating to the base station 210 to employ a combination of spatial multiplexing and transmit diversity.

The user equipment 250 may also be capable of receiving and processing signals in a plurality of frequency diverse carriers in a carrier aggregation mode, where one or more of transceivers 254a through 254r may be capable of changing their frequency of operation among two or more frequency bands At the base station 210, the modulated signals from the user equipment 250 are received by the transmitter system antennas 224, conditioned by the transceivers 222, demodulated by a demodulator 240, and processed by the RX data processor 242 to extract the reserve link message transmitted by the user equipment 250. Processor 230 at the base station 210 may then determine which pre-coding matrix to use for future forward link transmissions. Processor 230 can also use the received signal to adjust the beamforming weights for future forward link transmissions.

Processor 230 at the base station 210 and the processor 270 at the user equipment 250 may direct operations at their respective systems. Additionally, a memory 232 at the base station 210 and a memory 272 at the user equipment 250 can provide storage for program codes and data used by the transmitter system processor 230 and the receiver system processor 270, respectively. Further, at the user equipment 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques. Continuing reference to a UE, eNB, and network will be understood as applicable to the corresponding entities of FIG. 1 and FIG. 2 throughout the present disclosure.

A multi-carrier user equipment such as UE 250 may be configured with one or more receivers tuneable to one or more frequency bands. Depending on the particular configuration of receivers, the UE may need to tune away from the frequency band of its current serving cell to measure another frequency band from the serving cell or from a neighbouring cell. Such measurements may be needed, for example, to assess the quality of a carrier channel before establishing a connection on the carrier. The measurements may include reference signal received power (RSRP) measurement and carrier received signal strength indication (RSSI), for example, and may be used as part of a radio resource management scheme to facilitate and optimize intra-cell band-switching and inter-cell handoff decisions. The time period during which the UE is tuned away from its serving cell is referred to as a "measurement gap."

For a given UE receiver architecture and a given serving band, the UE may or may not need measurement gaps for a targeted measurement band. The need for a measurement gap may depend, for example, on whether the two bands (serving and measurement) are supported by the same receiver in the UE or by different receivers in the UE, under the constraint that each receiver in the UE can only be tuned to one band at a time.

Figures 3, 4:
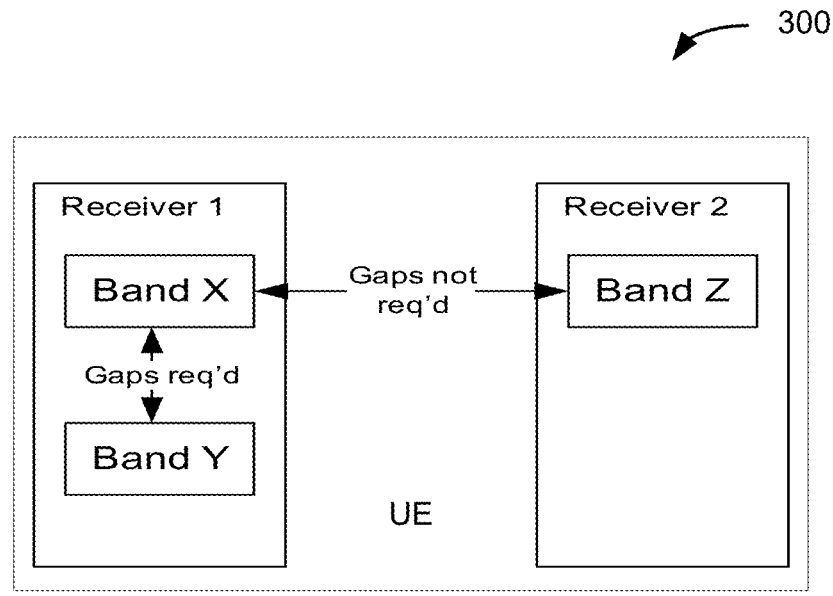
FIG. 3 illustrates an exemplary receiver configuration with a deterministic measurement gap requirement.
FIG. 4 illustrates an exemplary measurement gap matrix corresponding to the receiver configuration of FIG. 3.

FIG. 3 illustrates an exemplary case for a UE 300 with two receivers, Receiver 1 and Receiver 2, where Receiver 1 is a multi-band receiver that can be tuned to band X or band Y, and Receiver 2 is a one-band receiver tuneable to band Z only. In this example, if the UE 300 is being served in band X, then Receiver 1 would require a measurement gap to tune from band X to band Y in order to measure band Y (and vice versa). In contrast, if the UE 300 is being served in band X or band Y, then the UE 300 can measure band Z without interrupting the service on band X or band Y, such that no measurement gap is needed.

These relations can be indicated by a matrix of flags contained in the UE's network registered capabilities (e.g., in the field "interFreqNeedForGaps"), where a flag is provided for each pair of supported bands. The matrix corresponding to FIG. 3 is illustrated in FIG. 4 where a 1 indicates that a measurement gap is needed and a 0 indicates that a measurement gap is not needed.

This level of signalling can capture the need for measurement gaps in the case where the supported bands in each receiver are disjoint. This level of signalling is also adequate in a carrier aggregation environment, as proposed for LTE Advanced, where each carrier is supported by a single receiver. However, for UEs having multiple receivers that are tuneable to at least one band in common (e.g., one receiver supports bands A, B, C, while a second receiver supports bands C, D, E), the mechanism may be changed to capture the need for measurement gaps with greater accuracy. As an example, consider a UE 500 with two receivers as illustrated in FIGS. 5A and 5B, where Receiver 1 supports bands A, B, and C, Receiver 2 supports bands C, D, and E and band C is active (i.e., band C is the serving cell band).

Figure 5A:
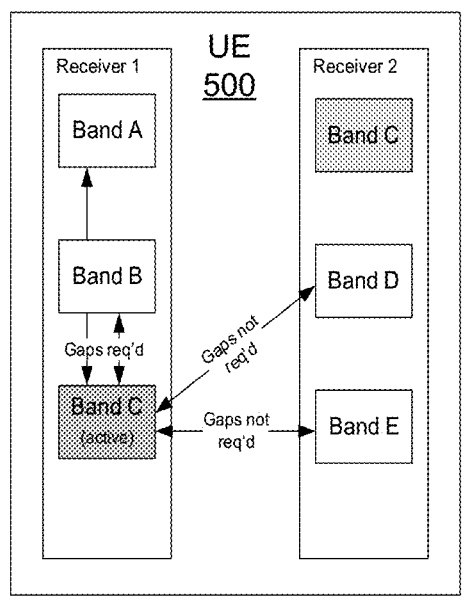
FIG. 5A illustrate an exemplary multi-band, multi-receiver device in a first configuration.
Figure 5B:
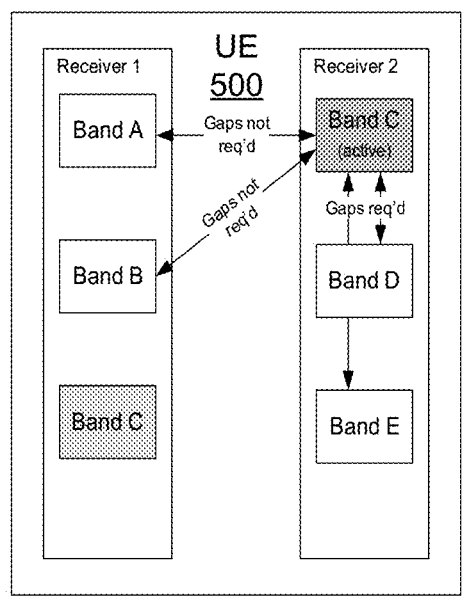
FIG. 5B illustrates the exemplary multi-band, multi-receiver device of FIG. 5A in a second configuration.

In FIG. 5A, the UE 500 is configured with band C, using Receiver 1. The UE 500 can measure bands D and E without measurement gaps, using Receiver 2, but requires measurement gaps to measure bands A and B. In FIG. 5B, the situation is reversed. By using Receiver 2 for the active band C, the UE 500 can measure bands A and B without a need for measurement gaps, but needs measurement gaps for measurement of bands D and E. This simple example shows a case where the approach of FIG. 4 may not be adequate because it does not account for the presence of a common band (such as band C) on two or more receivers.

In general, ambiguity can result when for a dual receiver when the serving band is supported by multiple receivers and the measurement band is supported by only one receiver. In a single carrier system, such as LTE Rel-8, a UE can signal that gaps are always required and accept the incremental cost in user throughput that comes from assigning gaps even where they are not needed. Alternatively, if the UE is capable of dynamically reassigning the serving band from one receiver to another, the UE could signal that gaps are never required. However, as described herein, a UE may need to signal measurement gap requirements s for different combinations of bands (more than two) in a multi-carrier environment.

For example, the UE may indicate its supported bands in a list of groups, with each group having the property that bands in the same group require gaps for measurement, while bands in different groups do not. A symmetric relationship can be posited, in which a UE operating on band X needs a gap to measure band Y if and only if it would, while operating on band Y, also need a gap to measure band X. In general, these "groups" correspond to separate receivers, but may also represent logical groups based on the specific capabilities of a UE. For example, the architecture of a particular UE might dictate that certain pairs of bands require gaps even if they reside on different receivers. However, another UE implementation might be able to perform certain inter-band measurements within a single receiver without the need for gaps (e.g., by dynamically switching an active band from one receiver to another receiver as described above and in greater detail below).

Referring again to FIGS. 5A and 5B, for example, the UE could signal band support as two groups, namely {A, B, C} and {C, D, E}, where the signalling format could be any of various well-known methods of representing lists of data values.

In the case where the signaled groups are disjoint (i.e., no common bands, which is not the case in FIGS. 5A and 5B), the signalling may be equivalent to the format described above, with a value of 1 ("true", indicating that gaps are needed for measurement) being signalled for pairs of bands in the same group, and 0 ("false", indicating that gaps are not needed) for pairs of bands in different groups. However, if the groups overlap, as in the example of FIGS. 5A and 5B, the need for gaps may vary based on which of the two receivers is assigned to the common band (e.g., band C in the example of FIGS. 5A and 5B).

Following is a description of an exemplary method for determining if measurement gaps are needed when a UE with a particular configuration of active carriers takes measurements on an additional carrier in a different band.

Case 1: If the measured band does not occur in any group that contains at least one active carrier, then no gap is needed.

Case 2: If the band groups are disjoint, and the measured band occurs in a group that contains an active carrier, then a gap is needed.

If neither Case 1 nor Case 2 apply, then the measured band shares a group with at least one active carrier, and additional information may be needed to determine if a measurement gap is required. Referring again to the example of FIGS. 5A and 5B, if band A is active and band C is to be measured, gaps are needed only if Receiver 2 has an active band (e.g., if band D or E is active).

Figure 6A:
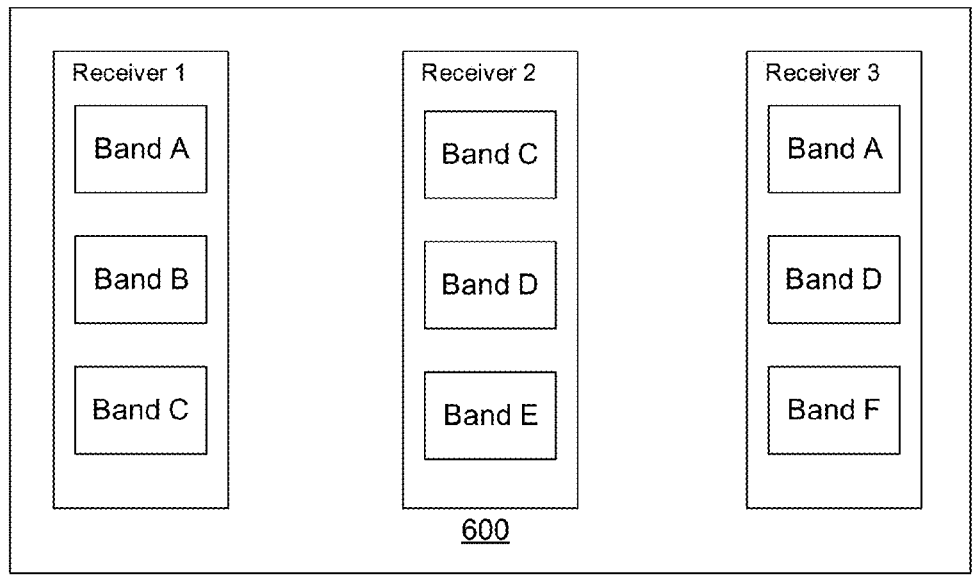
FIG. 6A illustrates another exemplary multi-band, multi-receiver device.

In a multi-carrier system, the operating bands of a UE may be dynamically or semi-statically configured (e.g., by RRC signalling), such that a particular band may be active during one time period and inactive (deactivated) during another time period. According to the present disclosure, a UE may dynamically update its indicated measurement capabilities as its configuration changes. In this approach, the indicated band support is not a static set of characteristics of the UE but reflects its capabilities as a function of its current configuration. As an example, consider a UE 600 with three receivers having different sets of supported bands, as shown in FIG. 6A, with Receiver 1 supporting bands A, B and C; Receiver 2 supporting bands C, D and E; and Receiver 3 supporting bands A, D and F.

Assume, for example, that UE 600 has been configured to operate on bands B and D. Band B occupies Receiver 1; band D could be assigned by the UE 600 either to Receiver 2 or Receiver 3. The UE 600 may select the assigned receiver based on particular criteria, such as the set of bands known to be in use in the service area. For example, if the UE 600 has received a message from a base station that the network uses band F in the service area, it could assign band D to Receiver 2 in order to leave Receiver 3 free to measure band F without measurement gaps (and/or to be later brought to active mode on band F). In this case, the configuration of the UE 600 would be as shown in FIG. 6B with Band B active on Receiver 1 and Band D active on Receiver 2.

Figure 6B:
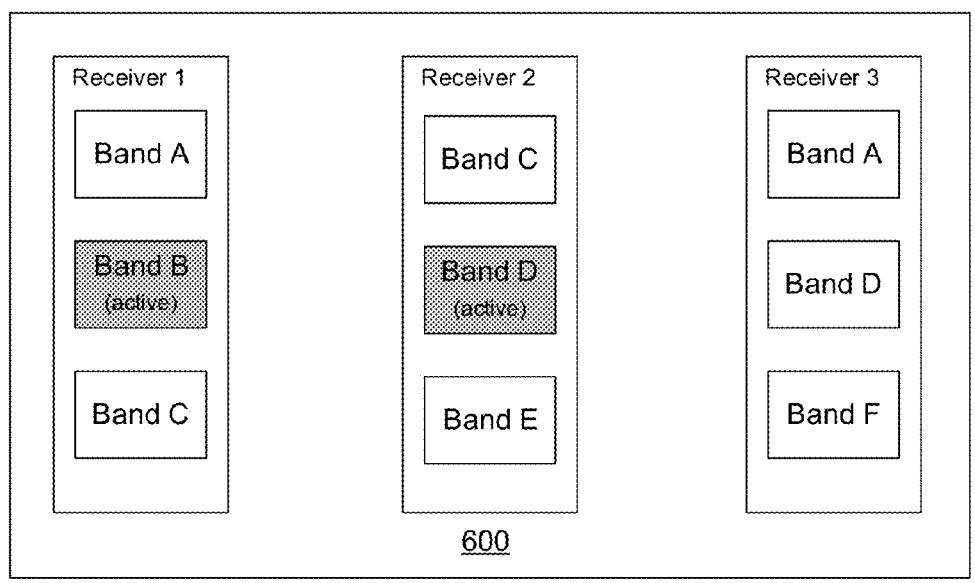
FIG. 6B illustrates the exemplary multi-band, multi-receiver device of FIG. 6A in a first configuration.
Figure 7:
FIG. 7 is an exemplary table illustrating UE-determined measurement gap requirements.

In the configuration of FIG. 6B, the UE 600 can measure bands A and F without gaps, using Receiver 3, but requires gaps to measure bands C (on Receiver 1 or Receiver 2) and E (on Receiver 2 only). The UE can signal this information to the network via the serving cell as a single list of flags for the supported bands, where each flag indicates if measurement gaps are required in the current configuration note that reporting on active bands may be omitted because the serving cell is already communicating with the UE 600 on these bands. FIG. 7 is a table 700 illustrating the information that the UE could signal for this example. Table 700 contains one entry for each unique band supported by the UE 600, and indicates if a measurement gap is needed (Bands C and C), not needed (Bands A and F) or omitted because the band is active (Bands B and D).

Figure 8:
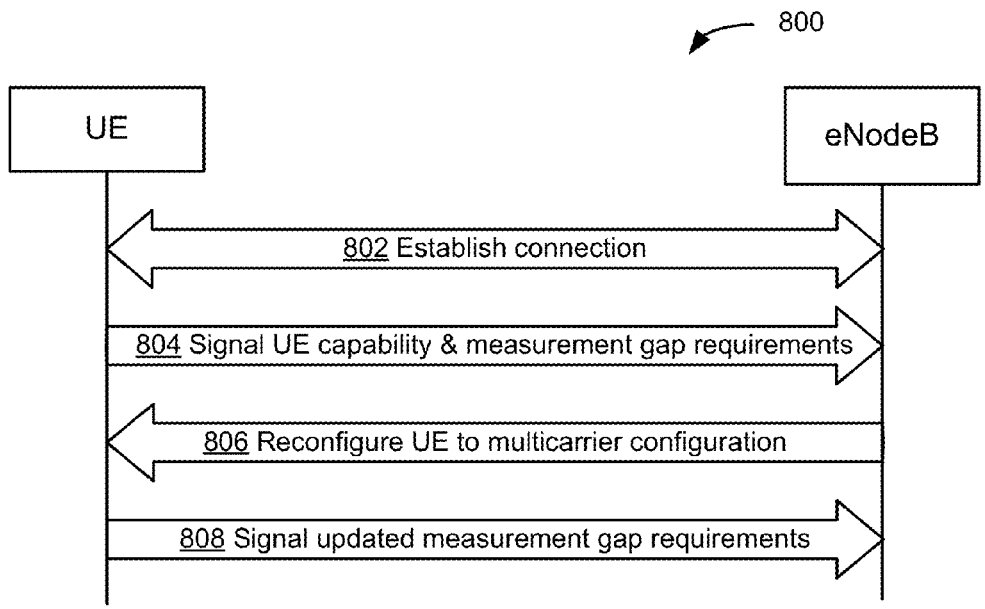
FIG. 8 is a flow diagram illustrating exemplary signalling and updating of measurement gap capabilities in a multi-carrier environment.

When the set of active carriers changes, or when the UE 600 reassigns internal resources (e.g., by transferring operation on band D from Receiver 2 to Receiver 3), this information may be updated. FIG. 8 is a high-level flow diagram 800 illustrating an exemplary method for signalling and updating measurement gap capabilities upon the establishment of a Radio Resource Control (RRC) connection between a UE and an eNodeB (eNB).

In operation 802, an RRC connection is established. In operation 804, the UE signals its capabilities to the eNodeB, including its measurement gap requirements for its current configuration. In operation 806, the eNodeB reconfigures the UE to a multi-carrier configuration (e.g., as illustrated in FIG. 6B). And in operation 808, the UE updates its measurement gap requirements based on the multi-carrier configuration. Operations 806 and 808 may then be iterated whenever the carrier configuration of the UE is reconfigured by the eNodeB.

Updates to the UE's measurement gap requirements may be signaled by iterating the signalling of UE capability in a single-carrier system (e.g., using the "InterFreqNeedForGaps" field defined for LTE Rel-8), and may be triggered by reconfiguration commands from the network that are transmitted to the UE by the eNodeB. Alternatively, a new signalling mode may be provided as an extension to the existing reconfiguration messages. For example, a UE's measurement gap requirements could be signalled in the "RRCConnectionReconfigurationComplete" message, which concludes the reconfiguration procedure in the existing LTE Rel-8 RRC protocol.

As noted above, a UE's measurement gap requirements may change without a reconfiguration command from the eNodeB (e.g., due to an internal UE decision to reassign reception of a particular band to a different receiver). Accordingly, operation 808 of method 800 may be triggered independently by the UE. The UE could, for example, use a new message or an extension to the existing "UECapabilityInformation" message defined in LTE Rel-8.

One aspect of this approach is that it can support the "legacy" mechanism of LTE Rel-8 when the UE is not in a carrier-aggregation configuration whereby the transfer of the new information is complementary to this basic configuration. In particular, the modified "band group" signalling described above can be avoided in single-carrier/legacy mode operation. Rather than signalling a list of band groups that mirrors the structure of the UE's receiver implementation, the UE may provide a dynamically updated statement of its current capabilities.

When the network receives the "group" signalling described above, without a more detailed information transfer, it may make either a "pessimistic" assumption about the need for gaps or an "optimistic" assumption about the need for gaps. The "pessimistic" view is that if a measurement gap might be needed, then the network assumes that a gap is needed. In particular, if the band to be measured appears in any signalled group along with any active band, a measurement-gap will be allocated by the network.

Referring again to the UE 600 illustrated in FIG. 6B, assume that the UE 600 is first brought to a connected mode on band B, and then to a carrier aggregation (dual-carrier) configuration with bands B and D both active. At the time when the RRC connection is established, the UE 600 may indicate its band support groups (reflecting the band capability of the three receivers), and the network can use this information through the duration of the connection to infer when gaps will be required. For example, immediately after the connection is established, the network may consider that group 1 is "occupied" by the assignment of a carrier in band B, and may assume that the measurements of any other band in the Receiver 1 group (i.e., bands A and C) will require a gap, even if that band is supported by another receiver (e.g., Receiver 3 in FIG. 6B), while measurements of other supported bands (D, E, and F) will not require a measurement gap.

When the second carrier (in band D) is added, under a pessimistic assumption, the network will consider group 1 to be occupied by band B, group 2 to be occupied by band D, and group 3 to be occupied by band D. It follows that all inter-frequency measurements will be assumed to require gaps because every group is assumed to be occupied. This assumption is obviously more pessimistic than necessary. If the network knew that band D was assigned to group (receiver) 2, it could infer that bands A and F would be measurable without gaps, but in the absence of this information it may assume that the band D assignment could interfere with gapless measurements on either group 2 or group 3.

Figure 9:
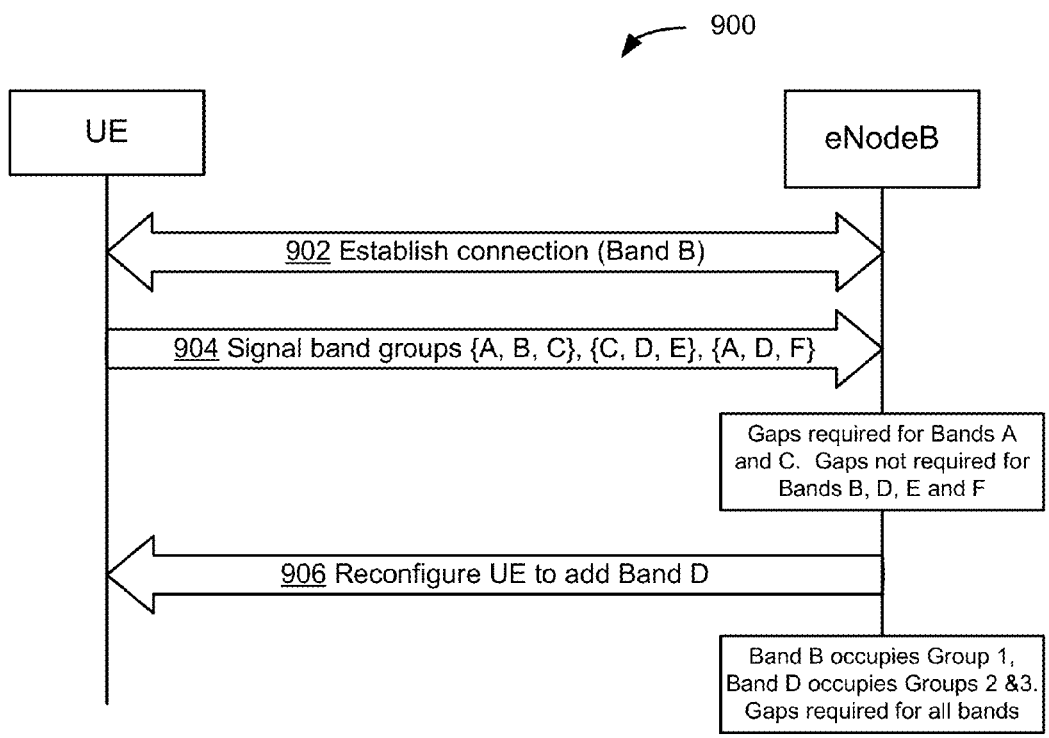
FIG. 9 is a flow diagram illustrating additional aspects of signaling and updating measurement gap capabilities in a multi-carrier environment.

A corresponding flow diagram 900 is illustrated in FIG. 9. In operation 902, a connection is established on band B between the UE and the eNodeB. In operation 904, the UE signals its group configurations to the network via the eNodeB and the network assumes that measurement gaps are required for bands A and C (even though band A is available in group 3 and band C is available in group 2). In operation 906, the eNodeB transmits a reconfiguration command from the network, reconfiguring the UE to add band D, and the network assumes that group 2 and group 3 are occupied in addition to group 1 because band D could be active on either group 2 or group 3. This pessimistic approach is more conservative than necessary. For example, in the case where all the receivers in a UE are identical (i.e., support the same bands), this scheme will allocate gaps for all inter-frequency measurements in every case, because any single band is assumed to occupy all the identical groups.

Alternatively, the network may assume that the UE can perform an intelligent reassignment of resources to perform measurements without gaps whenever possible. Referring again to the example of FIG. 6B, where Receiver 1 is assigned to band B and Receiver 2 is assigned to band D, the UE can measure without gaps on bands A and F (using Receiver 3), but measurements on band C require gaps. However, if the UE needs to measure band C, it can reassign band D to Receiver 3, thus freeing Receiver 2 to perform the measurements without the need for a gap.

If the network assumes this intelligent behaviour on the part of the UE (or the UE signals its capability to the network), then it can safely configure the UE to measure band C without configuring and activating a measurement gap.

Figure 10:
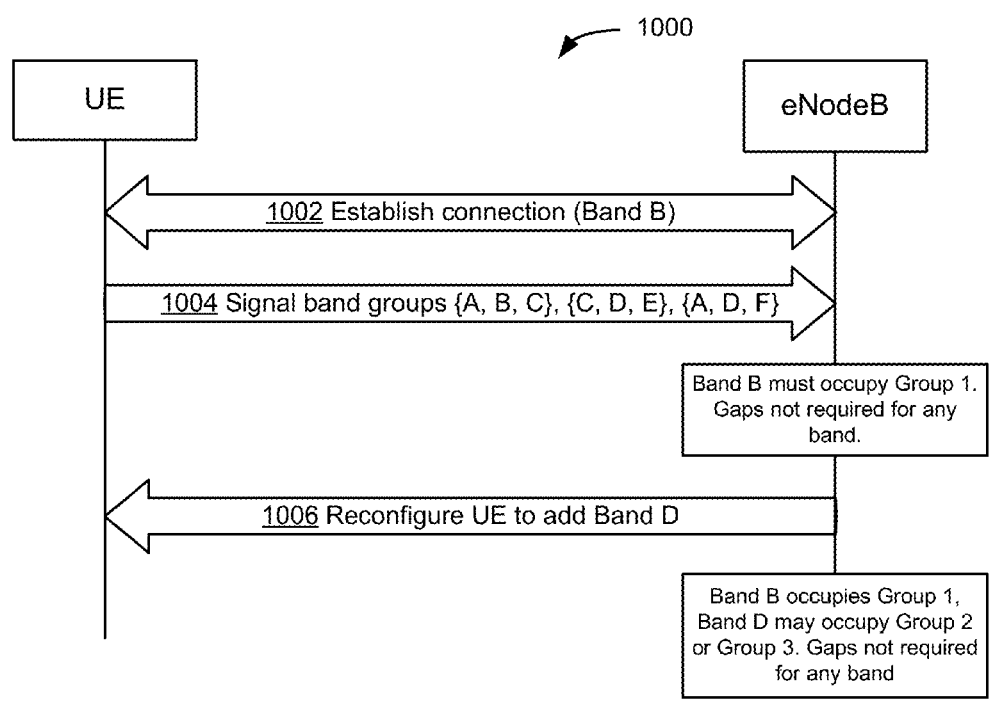
FIG. 10 is a flow diagram illustrating further aspects of signaling and updating measurement gap capabilities in a multi-carrier environment.

The corresponding flow diagram 1000 for this "optimistic" assumption is illustrated in FIG. 10. In operation 1002, the network establishes a connection between the eNobeB and the UE on Band B. In operation 1004, the UE signals its group configuration to the network via the eNodeB and the network knows that only group 2 is occupied because that is the only group that supports Band B. In operation 1006, the eNodeB transmits a reconfiguration command from the network, reconfiguring the UE to activate Band D, and the network assumes that the UE can dynamically assign Band D to either group 2 or group 3, such that no measurement gaps are required for measurement of bands A, C, E or F. In effect, the network is applying the following rule: if there is a one-to-one mapping of the active bands to the indicated groups, such that the band to be measured is included in at least one unassigned group, then no gap is required.

Table 1 below illustrates an exemplary mapping of bands for the UE configuration illustrated in FIG. 6, and shows how a UE that can dynamically reassign bands to different receivers allows measurement without gaps on all bands.

TABLE 1

| Measured band | Required mapping |
| --- | --- |
| A | B: group 1, D: group 2 |
|  | Measure: group 3 |
| C | B: group 1, D: group 3 |
|  | Measure: group 2 |

TABLE 1-continued

| Measured band | Required mapping |
| --- | --- |
| E | B: group 1, D: group 2 |
|   | Measure: group 3 |
| F | B: group 1, D: group 2 |
|   | Measure: group 3 |

This approach may be supported when the UE and the network both have the capability to determine if such a mapping exists. If the capability does exist, the network will not configure a measurement gap, and the UE may perform dynamic reassignment of resources (in the case of the example described, moving band D between Receivers 2 and 3 as necessary) to avoid misalignment with the network.

A base station (such as base station 210) and a UE (such as user equipment 250) may share a set of standard carrier aggregation (CA) configurations. Using the set of CA configurations, the UE may report its capability to support different measurement scenarios. For example, in a wireless communication system that supports up to five aggregated carriers, the UE may provide a table or other data structure, including a plurality of flags, defining four predetermined CA configurations comprising 2, 3, 4 and 5 carriers in bands A, B, C, D and E, where each carrier has a 20 MHz bandwidth, as shown in Table 2 below. It will be appreciated that many different configurations may be defined, and embodiments disclosed herein are not limited to the examples provided.

TABLE 2

| CONFIGURATION | Band A | Band B | Band C | Band D | Band E |
| --- | --- | --- | --- | --- | --- |
| 1 | 20 MHz | 20 MHz |  |  |  |
| 2 | 20 MHz | 20 MHz | 20 MHz |  |  |
| 3 | 20 MHz | 20 MHz | 20 MHz | 20 MHz |  |
| 4 | 20 MHz | 20 MHz | 20 MHz | 20 MHz | 20 MHz |

If a UE can support, for example, only configurations 1 and 2, it may signal that capability (e.g., using a "UECapabilityInformation" message) using a 4-bit flag to identify the supported configurations, such as {1, 1, 0, 0}. This signaling could convey, for example, that the UE has at least three receivers where each receiver supports at least a different one of each of carriers A, B and C. However, this signaling would not provide any additional information regarding the number of receivers in the UE or the bands that are supported by each receiver. In particular, it would not convey information about UE-specific gap requirements when performing requested band measurements.

For example, if the network configures the UE in configuration 1 (bands A and B), and then requests a measurement of band D, the network could look at configuration-dependent signaling (e.g., as illustrated in FIG. 8) in the UE capability "InterFreqNeedForGaps" message. If the UE reports that it can measure band D without gaps while active on band A, and can measure band D without gaps while active on band B, then the network can determine that band D must be on a different receiver than bands A or B, and that no gap is needed to measure band D based on an assumption about the physical architecture of the UE. However, the assumption could be wrong and unnecessarily limiting. For example, band D could be supported on two receivers in the UE, wherein band D could be measured without gaps only as long as just one of the two receivers is in use. To resolve the ambiguity in the signaled capabilities of the UE, additional signaling may be utilized beyond a simple configuration capability list.

Figures 11A, 11B:
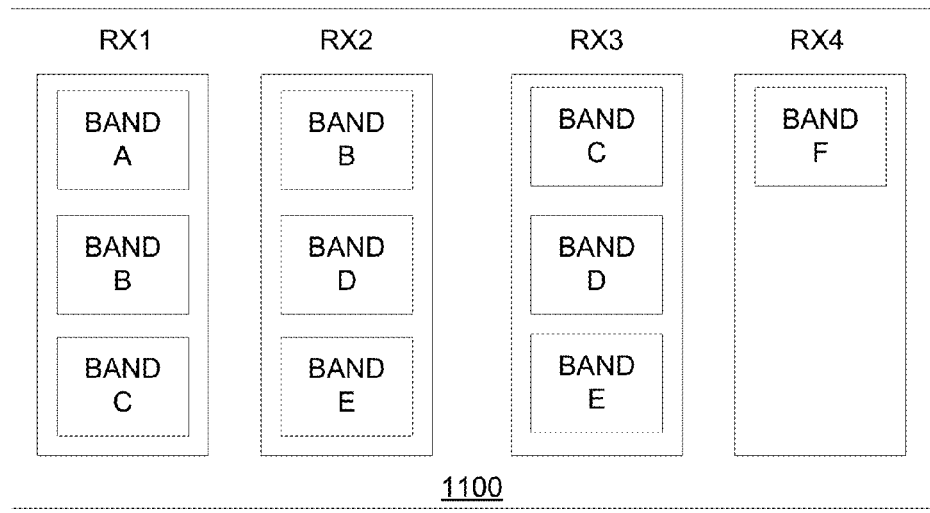
FIG. 11A illustrates an exemplary multi-band, multi-receiver device.
FIG. 11B are tables illustrating exemplary UE measurement gap requirements for the multi-band, multi-receiver device of FIG. 11A.

Referring now to FIG. 11A, it is assumed in the present example that a UE 1100 has a configuration where Receiver 1 (RX1) supports bands A, B and C; Receiver 2 (RX2) supports bands B, D and E; Receiver 3 (RX3) supports bands C, D and E; and Receiver 4 (RX4) supports band F. With respect to the previously defined CA configurations, the exemplary UE is capable of configuration 1 using RX1 for band A and RX2 for band B. It is also capable of configuration 2 by adding band C on RX3. However, the exemplary UE cannot support configuration 3 because it cannot add band D without dropping band B or band C. Nor can the UE support configuration 4, because it cannot add band E without dropping band C or band D.

The UE of FIG. 11A can signal its CA capability as described above, using 4 flag bits corresponding respectively to configurations 1, 2, 3 and 4. In this example, the flag bits would be {1, 1, 0, 0} as before. The UE can also signal its need for measurement gaps corresponding to each of the configurations it can support, as illustrated in FIG. 11B, including bands that are not in the supported CA configurations. In configuration 1, the UE can measure bands C, D, E and F without gaps because they reside on independent unused receivers (RX3 and RX4). In configuration 2, the UE can measure band F without a gap because it resides on unused receiver RX4. It does require gaps to measure bands D and E because both bands D and E share receiver RX2 with active band B and receiver RX3 with active band C. Bands B and C cannot be switched to RX1 because the only instance of active band A resides on RX1.

In this example, the UE signals a set of gap requirements corresponding to each of the CA configurations within its capabilities as well as the InterFreqNeedForGaps matrix for individual band-to-band measurement gaps independent of a CA configuration. For example, the UE may signal gap requirements for each supported CA configuration as part of an initial capabilities exchange with the network or in response to a reconfiguration command.

FIG. 11C illustrates an exemplary matrix for the UE 1100 of FIG. 11A. As shown, all of the pair-wise entries are 0 (no gap required) for this UE because no pair of bands is limited to a single receiver.

It is also possible to define a current InterFreqNeedForGaps matrix for other CA configurations within the capability of the UE whenever the UE is reconfigured. These matrices can be registered with the network as part of the UE's reported capabilities, or on the fly as the UE is reconfigured. For example, if the network requests a configuration where bands B, C and F are active, the UE can comply by configuring itself in several different ways, and can signal its measurement gap requirements based on the configuration it has chosen and its capabilities to make dynamic changes in its band-to-receiver alignment. Assume, for example, that the UE chooses to assign band B to RX1, band C to RX3 and band F (out of necessity) to RX4 and that the assignments are static. The corresponding matrix is illustrated in FIG. 11D. It will be appreciated that the UE could choose a different configuration to support a combination of bands B, C and F. For example, it could assign band B to RX2 instead of RX1. In that case, it will be appreciated that the UE would signal a different measurement gap matrix. It would also signal a different matrix if it is capable of dynamic reassignment of bands to receivers.

The signaling provided by a UE may depend on the physical and logical architecture of the UE and its inherent capabilities (e.g., dynamic switching). This applies as well to the predefined CA configurations within the capability of the UE.

However, since the signaling strategy depends at least partly on the capabilities of the UE, the network could request an impossible configuration for the UE. Accordingly, the UE may be configured to respond to a network reconfiguration or measurement request (e.g., "MeasurementConfig") with a response which indicates that the configuration cannot be achieved, that measurement gaps are required for the specified configuration or that the requested measurements cannot be performed at all.

Figure 12A:
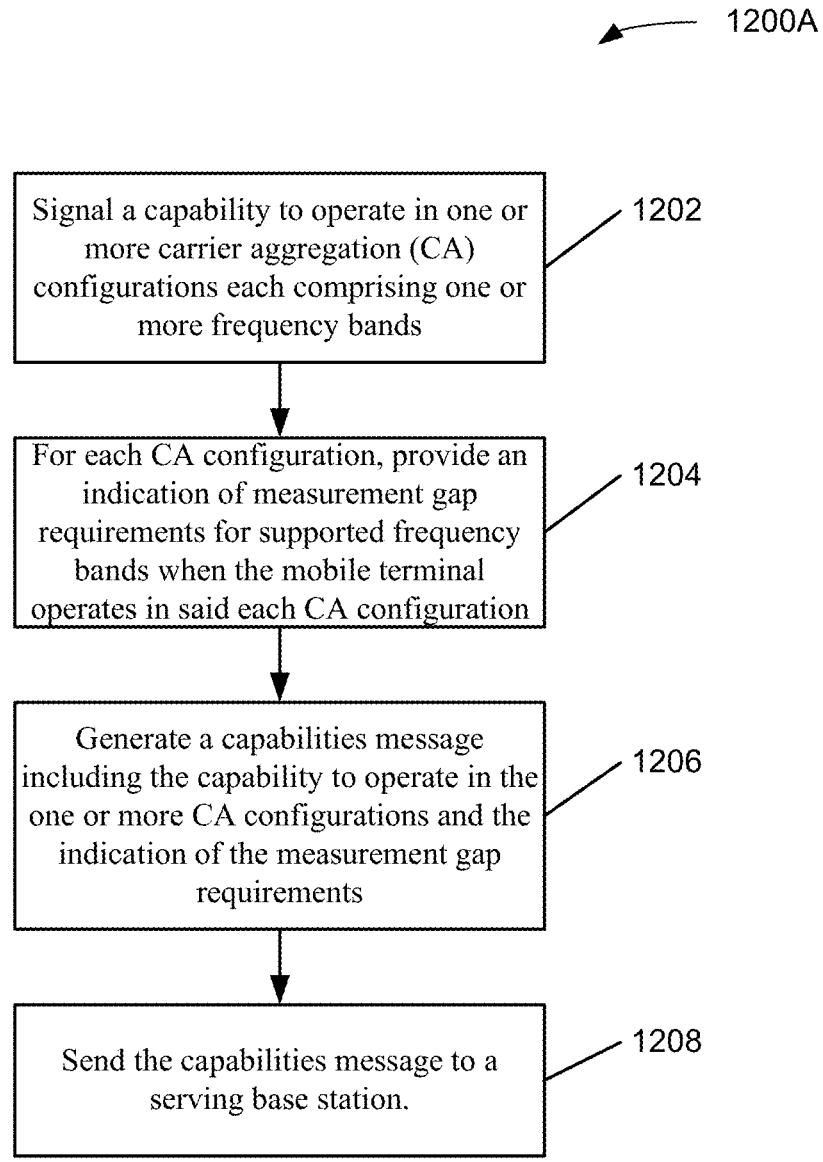
FIG. 12A is a flowchart illustrating an exemplary method in a mobile terminal.

FIG. 12A is a flowchart illustrating an exemplary method 1200A in a mobile terminal such as UE 250. The method begins at operation 1202, where the UE signals a capability to operate in one or more carrier aggregation (CA) configurations each comprising one or more frequency bands. In operation 1204, the UE can provide an indication of its measurement gap requirements when operating in each of the CA configurations. The measurement gap requirements can include all or a subset of the frequency bands supported by the UE. As an example, for a given CA configuration, the UE can report measurement gap requirements in relation to all of its supported frequency bands, or only in relation to frequency bands outside of the CA configuration. In operation 1206, the UE generates a capabilities message including the capability to operate in the one or more CA configurations and the indication of the measurement gap requirements. In operation 1208, the UE sends the capabilities message to a serving base station.

Figure 12B:
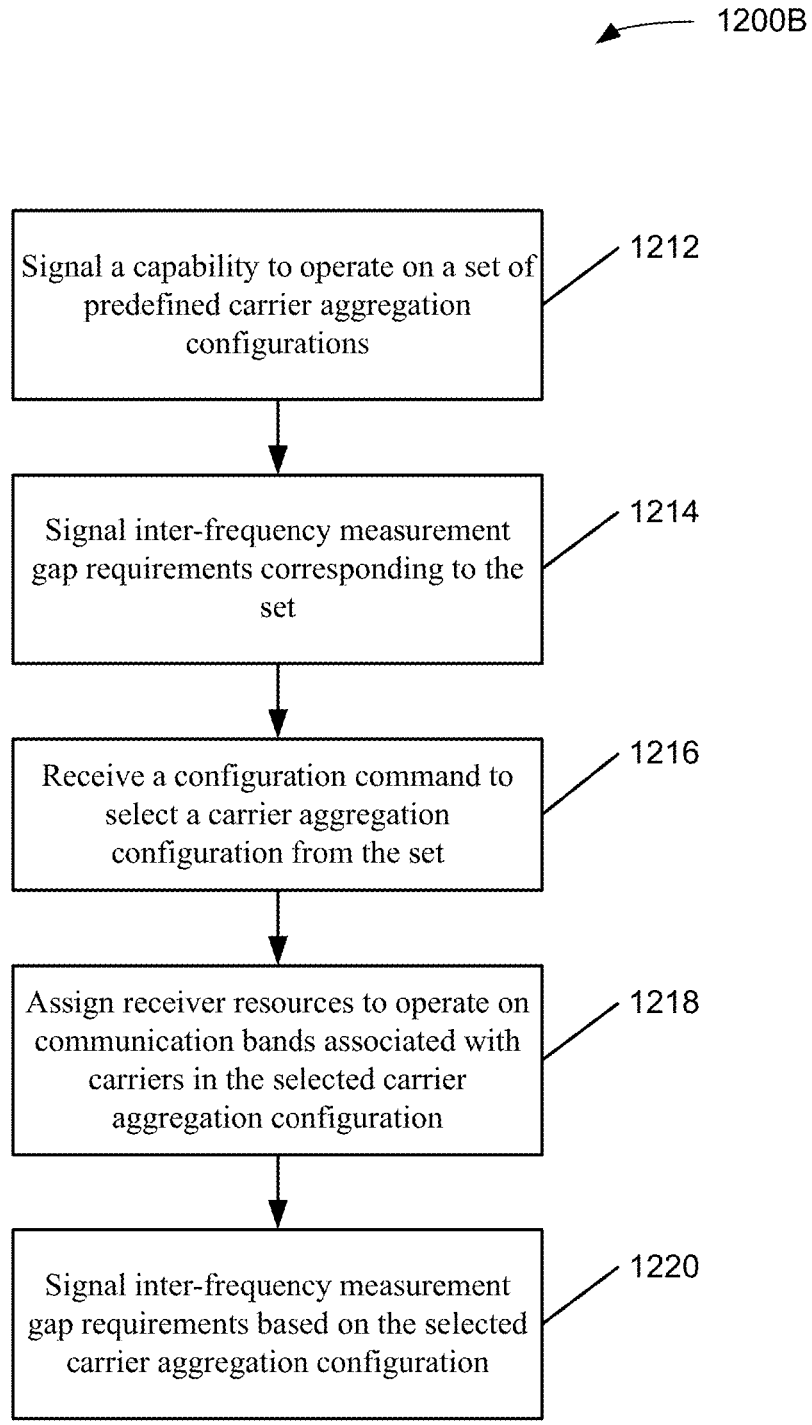
FIG. 12B is a flowchart illustrating another exemplary method in a mobile terminal.

FIG. 12B is a flowchart illustrating an exemplary method 1200B in a mobile terminal such as UE 250. The method begins at operation 1212, where the mobile terminal signals a capability to operate on a set of predefined carrier aggregation configurations.

At operation 1214, the mobile terminal signals inter-frequency measurement gap requirements corresponding to the set. At operation 1216, the mobile terminal receives a configuration command to select a carrier aggregation configuration from the set. At operation 1218, the mobile terminal assigns receiver resources to operate on communication bands associated with carriers in the selected carrier aggregation configuration. And, at operation 1220, the mobile terminal signals inter-frequency measurement gap requirements based on the selected carrier aggregation configuration.

Figure 13A:
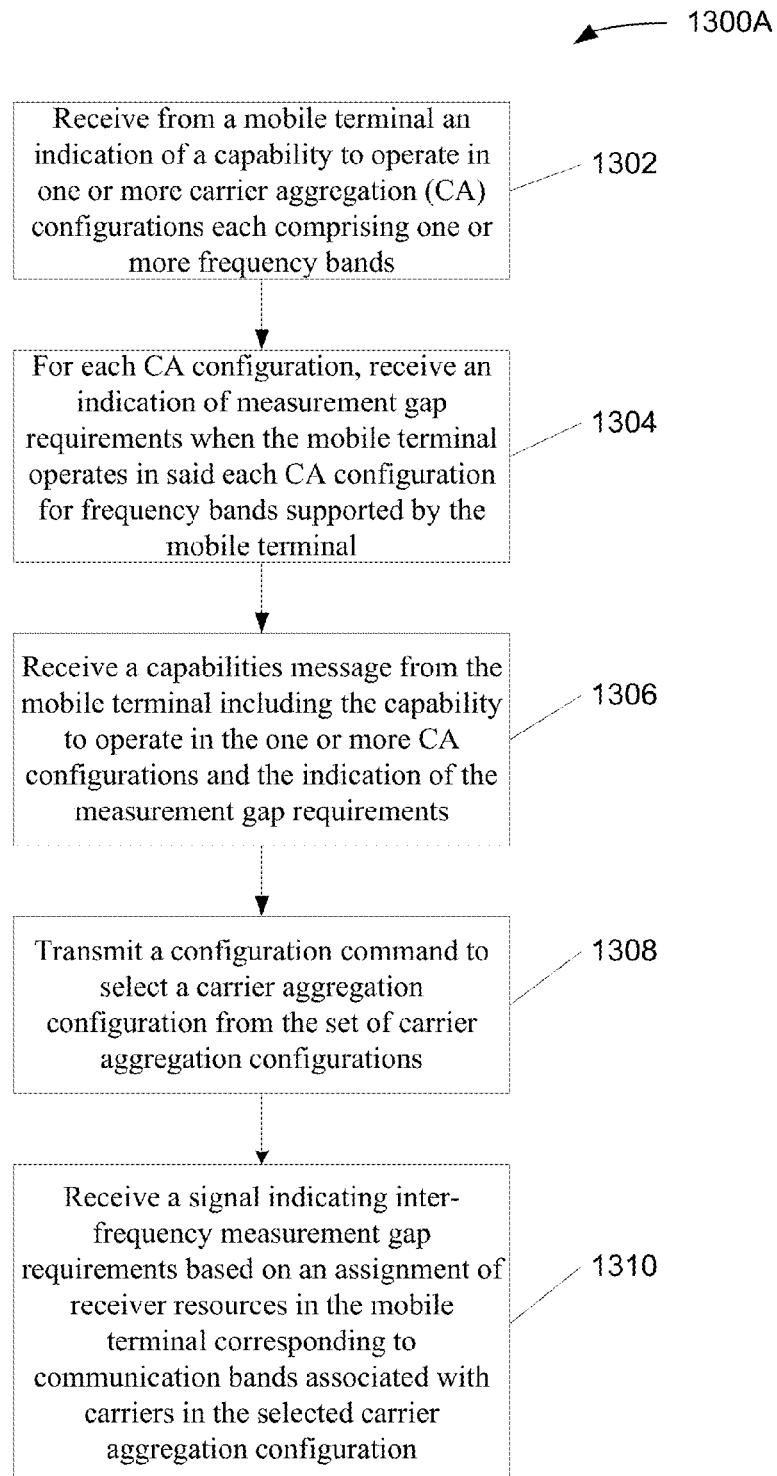
FIG. 13A is a flowchart illustrating an exemplary method in a base station.
Figure 13B:
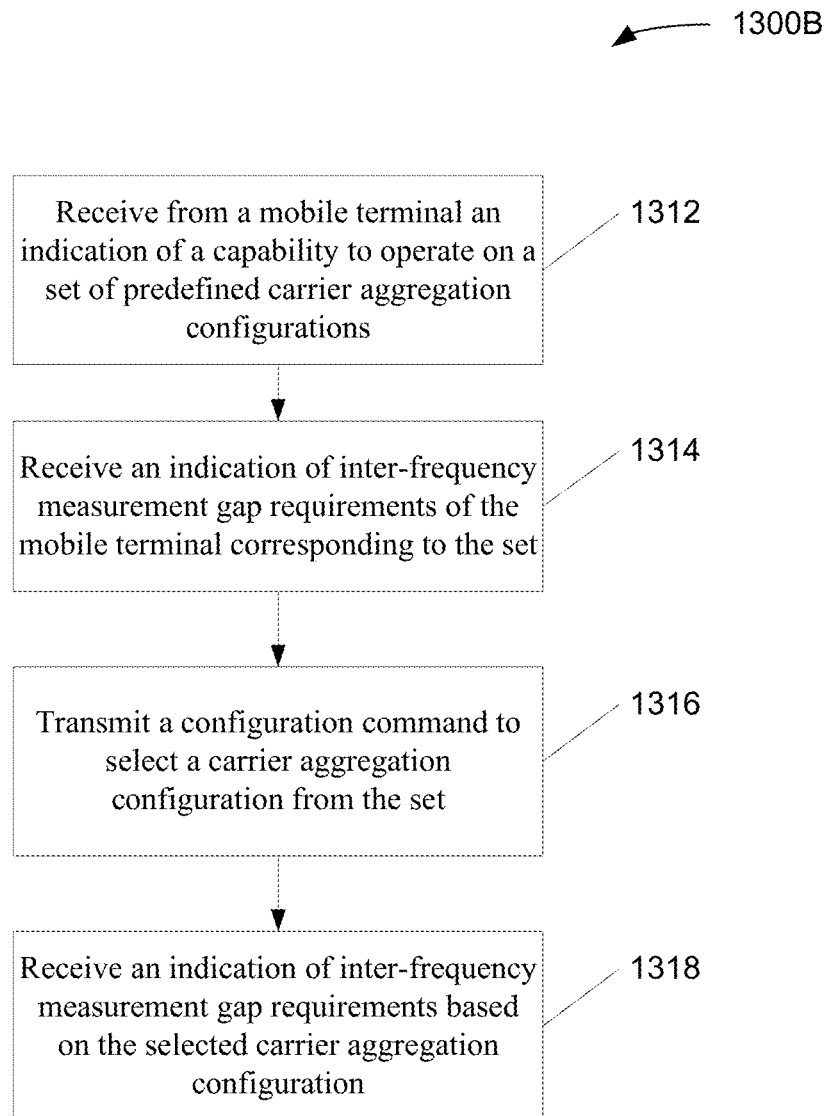
FIG. 13B is a flowchart illustrating an exemplary method in a base station.

FIG. 13A is a flowchart illustrating an exemplary method 1300A in a base station such as eNodeB 210. The method begins at operation 1302 where the base station receives from a mobile terminal an indication of a capability to operate in one or more carrier aggregation (CA) configurations each comprising one or more frequency bands. At operation 1304, for each CA configuration, the base station receives an indication of measurement gap requirements when the mobile terminal operates in said each CA configuration. The measurement gap requirements may be relative to some or all of the frequency bands supported by the mobile terminal. At operation 1306, the base station receives a capabilities message from the mobile terminal including the capability to operate in the one or more CA configurations and the indication of the measurement gap requirements. At operation 1308, the mobile station transmits a configuration command to select a carrier aggregation configuration from the set of carrier aggregation configurations. At operation 1310, the base station receives a signal indicating inter-frequency measurement gap requirements based on an assignment of receiver resources in the mobile terminal corresponding to communication bands associated with carriers in the selected carrier aggregation configuration FIG. 13B is a flowchart illustrating an exemplary method 1300B in a base station such as eNB 210. The method begins at operation 1312, where the base station receives from a mobile terminal an indication of a capability to operate on a set of predefined carrier aggregation configurations. At operation 1314, the base station receives an indication of inter-frequency measurement gap requirements of the mobile terminal corresponding to the set. At operation 1316, the base station transmits a configuration command to select a carrier aggregation configuration from the set. And, at operation 1318, the base station receives an indication of inter-frequency measurement gap requirements based on the selected carrier aggregation configuration.

Figure 14:
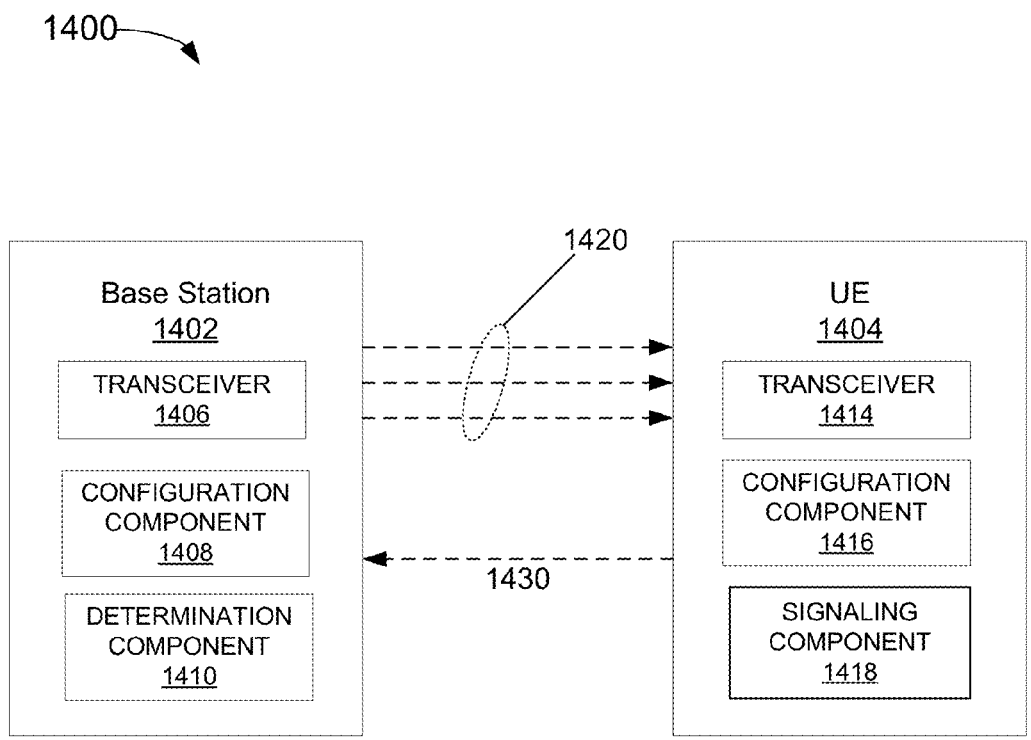
FIG. 14 is a block diagram of an exemplary system capable of implementing various disclosed methods.

FIG. 14 illustrates an exemplary system 1400 capable of supporting the various methods and operations described above. System 1400 includes a base station (eNodeB) 1402 that can transmit and/or receive information, signals, data, instructions, commands, bits, symbols and the like. Base station 1402 can communicate with a user equipment (UE) 1404 via a plurality of aggregated downlink carriers 1420 and at least an uplink carrier 1430 over a wireless communication network using transceiver 1406. UE 1404 can transmit and/or receive information, signals, data, instructions, commands, bits, symbols and the like using transceiver 1414. Moreover, although not shown, it is contemplated that any number of base stations similar to base station 1402 can be included in system 1400 and/or any number of UEs similar to UE 1404 can be included in system 1400.

Transceiver 1414 in UE 1404 may be configured to send messages to base station 1402 including messages signaling a capability to operate on a subset of a set of predefined carrier aggregation configurations and/or messages signaling the UE's requirements for measurement gaps based on the architecture of its radio resources. Transceiver 1414 may also be configured to receive configuration commands from base station 1402 that reconfigure the radio resources of UE 1404 to a selected carrier aggregation configuration. UE 1404 may also include a signaling component 1418 configured to generate signaling messages indicating compatible carrier aggregation configurations and measurement gap requirements corresponding to the carrier aggregation configurations. UE 1404 may also include a configuration component 1416 that assigns the radio resources of UE 1404 in response to the reconfiguration commands received from base station 1402.

Transceiver 1406 in base station 1402 may be configured to receive messages from UE 1404, including messages signaling a capability to operate on a subset of a set of predefined carrier aggregation configurations and/or messages indicating the UE's requirements for measurement gaps based on the architecture of its radio resources. Transceiver 1406 may also be configured to send configuration commands to UE 1404 to reconfigure the radio resources of UE 1404 to a selected carrier aggregation configuration. Base station 1402 may also include a determination component 1410 configured to select a carrier aggregation configuration for UE 1404 based on the signaled capabilities of UE 1404. Base station 1402 may also include a configuration component to generate configuration commands to be transmitted to UE 1404.

Figure 15:
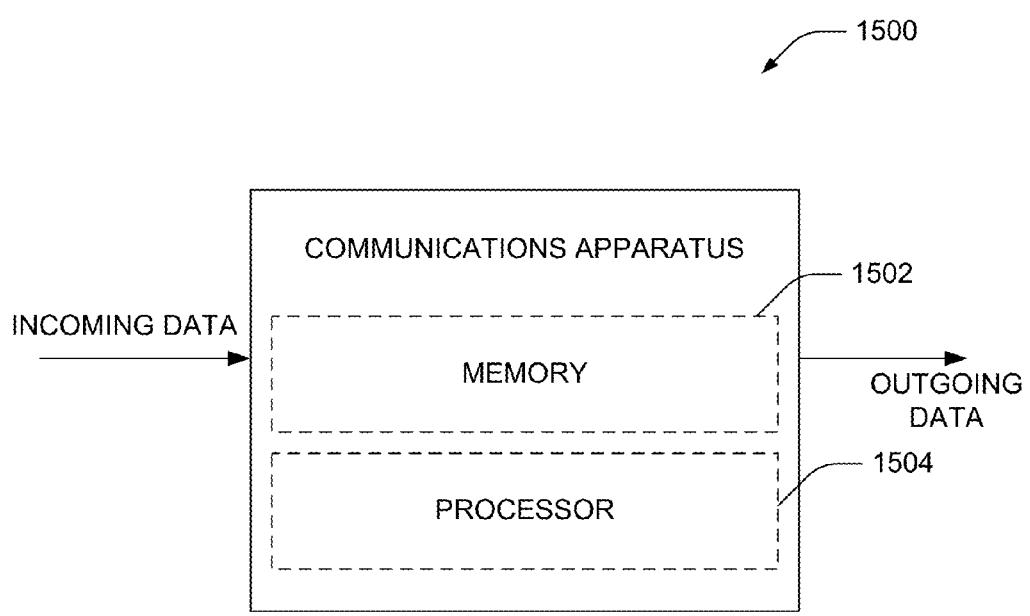
FIG. 15 is a communications apparatus capable of implementing various disclosed methods.

FIG. 15 illustrates an apparatus 1500 within which the various disclosed embodiments may be implemented. In particular, the apparatus 1500 that is shown in FIG. 15 may comprise at least a portion of a base station or at least a portion of a user equipment (such as the base station 1402 and the user equipment 1404 that are depicted in FIG. 14) and/or at least a portion of a transmitter system or a receiver system (such as the transmitter system 210 and the receiver system 250 that are depicted in FIG. 2). The apparatus 1500 that is depicted in FIG. 15 can be resident within a wireless network and receive incoming data via, for example, one or more receivers and/or the appropriate reception and decoding circuitry (e.g., antennas, transceivers, demodulators and the like). The apparatus 1500 that is depicted in FIG. 15 can also transmit outgoing data via, for example, one or more transmitters and/or the appropriate encoding and transmission circuitry (e.g., antennas, transceivers, modulators and the like). Additionally, or alternatively, the apparatus 1500 that is depicted in FIG. 15 may be resident within a wired network.

FIG. 15 further illustrates that the apparatus 1500 can include a memory 1502 that can retain instructions for performing one or more operations, such as signal conditioning, analysis and the like. Additionally, the apparatus 1500 of FIG. 15 may include a processor 1504 that can execute instructions that are stored in the memory 1502 and/or instructions that are received from another device. The instructions can relate to, for example, configuring or operating the apparatus 1500 or a related communications apparatus. It should be noted that while the memory 1502 that is depicted in FIG. 15 is shown as a single block, it may comprise two or more separate memories that constitute separate physical and/or logical units. In addition, the memory while being communicatively connected to the processor 1504, may reside fully or partially outside of the apparatus 1500 that is depicted in FIG. 15. It is also to be understood that one or more components, such as the configuration component 1408, configuration component 1416, determination component 1410 and signaling component 1418 that are shown in FIG. 14, can exist within a memory such as memory 1502.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 1500 of FIG. 15 can be employed with a user equipment or mobile device, and can be, for instance, a module such as an SD card, a network card, a wireless network card, a computer (including laptops, desktops, personal digital assistants PDAs), mobile phones, smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, or twisted pair, then the coaxial cable, fiber optic cable, or twisted pair are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment (e.g. UE 1404 in FIG. 14). In the alternative, the processor and the storage medium may reside as discrete components in a user equipment (e.g., components 1408, 1410, 1416 and 1418 of FIG. 14). Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method comprising:
signaling, by a mobile terminal, a capability to operate in a plurality of carrier aggregation (CA) configurations, each CA configuration comprising a combination of one or more frequency bands supported by one or more receivers of the mobile terminal;
obtaining, by the mobile terminal, measurement gap requirements in relation to target measurement bands, including a first target measurement band, associated with a first frequency band supported by the one or more receivers, and a second target measurement band, associated with a second frequency band supported by the one or more receivers, for operations by the mobile terminal in said each CA configuration; and
providing, by the mobile terminal, an indication of the measurement gap requirement for the first target measurement band and an indication of the measurement gap requirement for the second target measurement band.

2. The method of claim 1, further comprising:
generating a capabilities message including a capability to operate in the plurality of CA configurations and the indication of the measurement gap requirement for the first target measurement band and the indication of the measurement gap requirement for the second target measurement band; and
sending the capabilities message to a serving base station.

3. The method of claim 2, wherein generating the capabilities message is responsive to a request from the serving base station.

4. The method of claim 2, wherein generating the capabilities message is initiated by the mobile terminal in connection with a reconfiguration of radio resources.

5. The method of claim 1, wherein the one or more receivers of the mobile terminal comprises a plurality of receivers, and the measurement gap requirements are based on capabilities of the plurality of receivers.

6. The method of claim 5, wherein at least two of the plurality of receivers are capable of operating on a common frequency band.

7. The method of claim 1, wherein the measurement gap requirements correspond to a logical arrangement of receiver resources at the mobile terminal.

8. The method of claim 1, wherein at least one of the CA configurations comprises a single frequency band having a plurality of component carriers defined within the single frequency band.

9. The method of claim 1, wherein at least one of the CA configurations comprises a plurality of frequency bands defining a plurality of component carriers.

10. The method of claim 1, further comprising:
receiving a configuration command to select a CA configuration from the plurality of CA configurations;
assigning receiver resources to operate on frequency bands associated with carriers in the selected CA configuration; and
signaling inter-frequency measurement gap requirements based on the selected CA configuration.

11. The method of claim 10, further comprising:
receiving a reconfiguration request for another CA configuration selected from the plurality of CA configurations; and
signaling inter-frequency measurement gap requirements based on the other CA configuration.

12. The method of claim 10, further comprising:
receiving a frequency measurement request based on the inter-frequency measurement gap requirements; and
signaling an indication that the mobile terminal cannot comply when the frequency measurement request is incompatible with a logical or physical configuration of the mobile terminal.

13. The method of claim 1, wherein the indication of the measurement gap requirement for the first target measurement band comprises an indication that a measurement gap is required, and wherein the indication of the measurement gap requirement for the second target measurement band comprises an indication that a measurement gap is not required.

14. A method comprising:
signaling, by a mobile terminal, a capability to operate in a plurality of predefined carrier aggregation (CA) configurations, each predefined CA configuration comprising a combination of one or more frequency bands supported by one or more receivers of the mobile terminal;
obtaining, by the mobile terminal, inter-frequency measurement gap requirements in relation to target measurement bands, including a first target measurement band, associated with a first frequency band supported by the one or more receivers, and a second target measurement band, associated with a second frequency band supported by the one or more receivers, for operations by the mobile terminal in said each predefined CA configuration; and
signaling, by the mobile terminal, the inter-frequency measurement gap requirement for the first target measurement band and the inter-frequency measurement gap requirement for the second target measurement band.

15. The method of claim 14, further comprising:
receiving a configuration command to select a CA configuration from the plurality of predefined CA configurations;
assigning receiver resources from the one or more receivers to operate on frequency bands associated with carriers in the selected CA configuration; and
signaling the inter-frequency measurement gap requirements in relation to the target measurement bands based on the selected CA configuration.

16. A method in a base station, comprising:
receiving, from a mobile terminal, an indication of a capability to operate in a plurality of carrier aggregation (CA) configurations, each CA configuration comprising a combination of one or more frequency bands supported by one or more receivers of the mobile terminal; and
receiving an indication of measurement gap requirements of the mobile terminal in relation to target measurement bands, including a first target measurement band, associated with a first frequency band supported by the one or more receivers, and a second target measurement band, associated with a second frequency band supported by the one or more receivers, for operations by the mobile terminal in said each CA configuration, the indication of the measurement gap requirements including an indication of the measurement gap requirement for the first target measurement band and an indication of the measurement gap requirement for the second target measurement band.

17. The method of claim 16, further comprising receiving a capabilities message from the mobile terminal including the capability to operate in the plurality of CA configurations and the indication of the measurement gap requirements.

18. The method of claim 17, wherein the capabilities message is received based on a request from the base station.

19. The method of claim 17, wherein the capabilities message is received based on a reconfiguration of radio resources by the base station.

20. The method of claim 16, wherein the one or more receivers comprises a plurality of receivers, and wherein the measurement gap requirements correspond to capabilities of the plurality of receivers.

21. The method of claim 16, wherein the measurement gap requirements correspond to a logical arrangement of receiver resources at the mobile terminal.

22. The method of claim 16, wherein at least one of the plurality of CA configurations comprises a single frequency band having a plurality of component carriers defined within the single frequency band.

23. The method of claim 16, wherein at least one of the plurality of CA configurations comprises a plurality of frequency bands defining a plurality of component carriers.

24. The method of claim 16, further comprising:
transmitting a configuration command to select a CA configuration from the plurality of CA configurations; and
receiving a signal indicating inter-frequency measurement gap requirements based on an assignment of receiver resources in the mobile terminal corresponding to frequency bands associated with carriers in the selected CA configuration.

25. The method of claim 24, further comprising:
transmitting a reconfiguration request for another CA configuration selected from the plurality of CA configurations; and
receiving inter-frequency measurement gap requirements based on the other CA configuration.

26. The method of claim 24, further comprising:
transmitting a frequency measurement request based on the inter-frequency measurement gap requirements; and
receiving an indication that the mobile terminal cannot comply when the frequency measurement request is incompatible with a logical or physical configuration of the mobile terminal.

27. A method in a base station, comprising:
receiving, from a mobile terminal, an indication of a capability to operate in a plurality of predefined carrier aggregation (CA) configurations, each CA configuration comprising a combination of one or more frequency bands supported by one or more receivers of the mobile terminal; and
receiving an indication of inter-frequency measurement gap requirements of the mobile terminal in relation to target measurement bands, including a first target measurement band, associated with a first frequency band supported by the one or more receivers, and a second target measurement band, associated with a second frequency band supported by the one or more receivers, for operations by the mobile terminal in said each predefined CA configuration, the indication of the inter-frequency measurement gap requirements including an indication of the inter-frequency measurement gap requirement for the first target measurement band and an indication of the inter-frequency measurement gap requirement for the second target measurement band.

28. The method of claim 27, further comprising:
transmitting a configuration command to select a predefined CA configuration from the plurality of CA configurations, wherein the indication of inter-frequency measurement gap requirements is based on an assignment of receiver resources from the one or more receivers of the mobile terminal corresponding to frequency bands associated with carriers in the selected CA configuration.

29. The method of claim 27, wherein the indication of inter-frequency measurement gap requirements and the indication of the capability to operate in the plurality of predefined CA configurations are received from the mobile terminal in a same message, and wherein the same message is received based on a request from the base station.

30. A mobile terminal, comprising:
means for signaling a capability to operate in a plurality of carrier aggregation (CA) configurations, each CA configuration comprising a combination of one or more frequency bands supported by one or more receiving means of the mobile terminal;
means for obtaining measurement gap requirements in relation to target measurement bands, including a first target measurement band, associated with a first frequency band supported by the one or more receivers, and a second target measurement band, associated with a second frequency band supported by the one or more receivers, for operations by the mobile terminal in said each CA configuration; and
means for providing an indication of the measurement gap requirement for the first target measurement band and an indication of the measurement gap requirement for the second target measurement band.

31. The mobile terminal of claim 30, further comprising:
means for generating a capabilities message including a capability to operate in the plurality of CA configurations and the indication of the measurement gap requirement for the first target measurement band and the indication of the measurement gap requirement for the second target measurement band; and
means for sending the capabilities message to a serving base station.

32. The mobile terminal of claim 31, wherein the means for generating the capabilities message is operative based on a request from the serving base station.

33. The mobile terminal of claim 31, wherein the means for generating the capabilities message is initiated in connection with a reconfiguration of radio resources.

34. The mobile terminal of claim 30, wherein the one or more receiving means of the mobile terminal comprises a plurality of receiving means, and the measurement gap requirements are based on capabilities of the plurality of receiving means.

35. The mobile terminal of claim 34, wherein at least two of the plurality of receiving means are capable of operating on a common frequency band.

36. The mobile terminal of claim 30, wherein the measurement gap requirements correspond to a logical arrangement of the receiving means at the mobile terminal.

37. The mobile terminal of claim 30, wherein at least one of the plurality of CA configurations comprises a single frequency band having a plurality of component carriers defined within the single frequency band.

38. The mobile terminal of claim 30, wherein at least one of the plurality of CA configurations comprises a plurality of frequency bands defining a plurality of component carriers.

39. The mobile terminal of claim 30, further comprising:
means for receiving a configuration command to select a CA configuration from the plurality of CA configurations;
means for assigning receiver resources from the one or more receiving means to operate on frequency bands associated with carriers in the selected CA configuration; and
means for signaling inter-frequency measurement gap requirements based on the selected CA configuration.

40. The mobile terminal of claim 39, further comprising:
means for receiving a reconfiguration request for another CA configuration selected from the plurality of CA configurations; and
means for signaling inter-frequency measurement gap requirements based on the other CA configuration.

41. The mobile terminal of claim 39, further comprising:
means for receiving a frequency measurement request based on the inter-frequency measurement gap requirements; and
means for signaling an indication that the mobile terminal cannot comply when the frequency measurement request is incompatible with a logical or physical configuration of the mobile terminal.

42. A mobile terminal, comprising:
means for signaling a capability to operate in a plurality of predefined carrier aggregation (CA) configurations, each predefined CA configuration comprising a combination of one or more frequency bands supported by one or more receiving means of the mobile terminal;
means for obtaining inter-frequency measurement gap requirements in relation to one or more target measurement bands, including a first target measurement band, associated with a first frequency band supported by the one or more receivers, and a second target measurement band, associated with a second frequency band supported by the one or more receivers, for operations by the mobile terminal in said each predefined CA configuration; and
means for signaling the inter-frequency measurement gap requirement for the first target measurement band and the inter-frequency measurement gap requirement for the second target measurement band.

43. The mobile terminal of claim 42, comprising:
means for receiving a configuration command to select a predefined CA configuration from the plurality of CA configurations;
means for assigning receiver resources from the one or more receiving means to operate on frequency bands associated with carriers in the selected CA configuration; and
means for signaling inter-frequency measurement gap requirements based on the selected CA configuration.

44. A base station, comprising:
means for receiving, from a mobile terminal, an indication of a capability to operate in a plurality of carrier aggregation (CA) configurations, each CA configuration comprising a combination of one or more frequency bands supported by one or more receiving means of the mobile terminal; and
means for receiving an indication of measurement gap requirements of the mobile terminal in relation to target measurement bands, including a first target measurement band, associated with a first frequency band supported by the one or more receivers, and a second target measurement band, associated with a second frequency band supported by the one or more receivers, for operations by the mobile terminal in said each CA configuration,
the indication of the measurement gap requirements including an indication of the measurement gap requirement for the first target measurement band and an indication of the measurement gap requirement for the second target measurement band.

45. The base station of claim 44, further comprising means for receiving a capabilities message from the mobile terminal including the capability to operate in the plurality of CA configurations and the indication of the measurement gap requirements.

46. The base station of claim 45, wherein the capabilities message is received based on a request from the base station.

47. The base station of claim 45, wherein the capabilities message is received based on a reconfiguration of radio resources by the base station.

48. The base station of claim 44, wherein the one or more receiving means comprises a plurality of receiving means, and wherein the measurement gap requirements correspond to capabilities of the plurality of receivers.

49. The base station of claim 44, wherein the measurement gap requirements correspond to a logical arrangement of receiver resources at the mobile terminal.

50. The base station of claim 44, wherein at least one of the plurality of CA configurations comprises a single frequency band having a plurality of component carriers defined within the single frequency band.

51. The base station of claim 44, wherein at least one of the plurality of CA configurations comprises a plurality of frequency bands defining a plurality of component carriers.

52. The base station of claim 44, further comprising:
means for transmitting a configuration command to select a CA configuration from the plurality of CA configurations; and
means for receiving a signal indicating inter-frequency measurement gap requirements based on an assignment of receiver resources in the mobile terminal corresponding to frequency bands associated with carriers in the selected CA configuration.

53. The base station of claim 52, further comprising:
means for transmitting a reconfiguration request for another CA configuration selected from the plurality of CA configurations; and
means for receiving inter-frequency measurement gap requirements based on the other CA configuration.

54. The base station of claim 52, further comprising:
means for transmitting a frequency measurement request based on the inter-frequency measurement gap requirements; and
means for receiving an indication that the mobile terminal cannot comply when the frequency measurement request is incompatible with a logical or physical configuration of the mobile terminal.

55. A base station, comprising:
means for receiving from a mobile terminal an indication of a capability to operate in a plurality of predefined carrier aggregation (CA) configurations, each CA configuration comprising a combination of one or more frequency bands supported by one or more receiving means of the mobile terminal; and means for receiving, for each predefined CA configuration in the plurality of CA configurations, an indication of inter-frequency measurement gap requirements in relation to target measurement bands, including a first target measurement band, associated with a first frequency band supported by the one or more receivers, and a second target measurement band, associated with a second frequency band supported by the one or more receivers, for operations by the mobile terminal in said each CA configuration, the indication of the inter-frequency measurement gap requirements including an indication of the inter-frequency measurement gap requirement for the first target measurement band and an indication of the inter-frequency measurement gap requirement for the second target measurement band.

56. The base station of claim 55, further comprising:

means for transmitting a configuration command to select a predefined CA configuration from the plurality of CA configurations, wherein the indication of inter-frequency measurement gap requirements is received based on an assignment of receiver resources from the one or more receiving means in the mobile terminal corresponding to frequency bands associated with carriers in the selected CA configuration.

57. The base station of claim 55, wherein the indication of inter-frequency measurement gap requirements and the indication of the capability to operate on the plurality of predefined CA configurations are received from the mobile terminal in a same message, and wherein the same message is received based on a request from the base station.

58. A non-transitory storage medium storing instructions, the instructions comprising:

one or more instructions which, when executed by a processor, cause the processor to:

signal a capability to operate in a plurality of carrier aggregation (CA) configurations, each CA configuration comprising a combination of one or more frequency bands supported by one or more receivers of a mobile terminal;

obtain measurement gap requirements in relation to target measurement bands, including a first target measurement band, associated with a first frequency band supported by the one or more receivers, and a second target measurement band, associated with a second frequency band supported by the one or more receivers, for operations by the mobile terminal in said each CA configuration; and provide an indication of the measurement gap requirement for the first target measurement band and an indication of the measurement gap requirement for the second target measurement band.

59. A non-transitory storage medium storing instructions, the instructions comprising:

one or more instructions which, when executed by a processor, cause the processor to:

receive from a mobile terminal an indication of a capability to operate in a plurality of CA configurations, each predefined CA configuration comprising a combination of one or more frequency bands supported by one or more receivers of the mobile terminal; and receive an indication of inter-frequency measurement gap requirements of the mobile terminal in relation to target measurement bands, including a first target measurement band, associated with a first frequency band supported by the one or more receivers, and a second target measurement band, associated with a second frequency band supported by the one or more receivers, for operations by the mobile terminal in said each predefined CA configuration, the indication of the measurement gap requirements including an indication of the measurement gap requirement for the first target measurement band and an indication of the measurement gap requirement for the second target measurement band.

60. A mobile terminal, comprising:

a processor; and a memory comprising processor executable instructions that, when executed by the processor, configure the mobile terminal to:

signal a capability to operate in a plurality of carrier aggregation (CA) configurations, each CA configuration comprising a combination of one or more frequency bands supported by one or more receivers of the mobile terminal;

obtain measurement gap requirements in relation to target measurement bands, including a first target measurement band, associated with a first frequency band supported by the one or more receivers, and a second target measurement band, associated with a second frequency band supported by the one or more receivers, for operations by the mobile terminal in said each CA configuration; and provide an indication of the measurement gap requirement for the first target measurement band and an indication of the measurement gap requirement for the second target measurement band.

61. The mobile terminal of claim 60, wherein the mobile terminal is further configured to:

generate a capabilities message including a capability to operate in the plurality of CA configurations and the indication of the measurement gap requirement for the first target measurement band and the indication of the measurement gap requirement for the second target measurement band; and send the capabilities message to a serving base station.

62. The mobile terminal of claim 61, wherein the mobile terminal is configured to generate the capabilities message based on a request from the serving base station.

63. The mobile terminal of claim 61, wherein the mobile terminal is configured to generate the capabilities message based on a reconfiguration of radio resources.

64. The mobile terminal of claim 60, wherein the one or more receivers of the mobile terminal comprises a plurality of receivers, and the measurement gap requirements are based on capabilities of the plurality of receivers.

65. The mobile terminal of claim 64, wherein at least two of the plurality of receivers are capable of operating on a common frequency band.

66. The mobile terminal of claim 60, wherein the measurement gap requirements correspond to a logical arrangement of receiver resources at the mobile terminal.

67. The mobile terminal of claim 60, wherein at least one of the plurality of CA configurations comprises a single frequency band having a plurality of component carriers defined within the single frequency band.

68. The mobile terminal of claim 60, wherein at least one of the plurality of CA configurations comprises a plurality of frequency bands defining a plurality of component carriers.

69. The mobile terminal of claim 60, wherein the mobile terminal is further configured to:

receive a configuration command to select a CA configuration from the plurality of CA configurations;

assign receiver resources from the one or more receivers to operate on frequency bands associated with carriers in the selected CA configuration; and signal inter-frequency measurement gap requirements based on the selected CA configuration.

70. The mobile terminal of claim 69, wherein the mobile terminal is further configured to:

receive a reconfiguration request for another CA configuration selected from the plurality of CA configurations; and signal inter-frequency measurement gap requirements based on the other CA configuration.

71. The mobile terminal of claim 69, wherein the mobile terminal is further configured to:

receive a frequency measurement request based on the inter-frequency measurement gap requirements; and signal an indication that the mobile terminal cannot comply when the frequency measurement request is incompatible with a logical or physical configuration of the mobile terminal.

72. A base station, comprising:

a processor; and a memory comprising processor executable instructions that, when executed by the processor, configure the base station to:

receive, from a mobile terminal, an indication of a capability to operate in a plurality of carrier aggregation (CA) configurations, each CA configuration comprising a combination of one or more frequency bands supported by one or more receivers of the mobile terminal; and receive an indication of measurement gap requirements of the mobile terminal in relation to target measurement bands, including a first target measurement band, associated with a first frequency band supported by the one or more receivers, and a second target measurement band, associated with a second frequency band supported by the one or more receivers, for operations by the mobile terminal in said each CA configuration, the indication of the measurement gap requirements including an indication of the measurement gap requirement for the first target measurement band and an indication of the measurement gap requirement for the second target measurement band.

73. The base station of claim 72, wherein the base station is further configured to receive a capabilities message from the mobile terminal including the capability to operate in the plurality of CA configurations and the indication of the measurement gap requirements.

74. The base station of claim 73, wherein the capabilities message is received based on a request from the base station.

75. The base station of claim 73, wherein the capabilities message is received based on a reconfiguration of radio resources requested by the base station.

76. The base station of claim 72, wherein the measurement gap requirements correspond to capabilities of a plurality of receivers in the mobile terminal.

77. The base station of claim 72, wherein the measurement gap requirements correspond to a logical arrangement of receiver resources at the mobile terminal.

78. The base station of claim 72, wherein at least one of the plurality of CA configurations comprises a single frequency band having a plurality of component carriers defined within the single frequency band.

79. The base station of claim 72, wherein at least one of the plurality of CA configurations comprises a plurality of frequency bands defining a plurality of component carriers.

80. The base station of claim 72, wherein the base station is further configured to:

transmit a configuration command to select a CA configuration from the plurality of CA configurations; and receive a signal indicating inter-frequency measurement gap requirements based on an assignment of receiver resources in the mobile terminal corresponding to frequency bands associated with carriers in the selected CA configuration.

81. The base station of claim 80, wherein the base station is further configured to:

transmit a reconfiguration request for another CA configuration selected from the plurality of CA configurations; and receive inter-frequency measurement gap requirements based on the other CA configuration.

82. The base station of claim 80, wherein the base station is further configured to:

transmit a frequency measurement request based on the inter-frequency measurement gap requirements; and receive an indication that the mobile terminal cannot comply when the frequency measurement request is incompatible with a logical or physical configuration of the mobile terminal.

83. The base station of claim 82, wherein the signal indicating the inter-frequency measurement gap requirements comprises a signal indicating one or more band groups, each band group comprising a subset of frequency bands on which the mobile terminal is capable of communication.

* * * * *